United States Patent
Morin et al.

(10) Patent No.: US 9,539,755 B2
(45) Date of Patent: Jan. 10, 2017

(54) DEVICE FOR TRANSPORTING A HOLLOW BODY COMPRISING IMPROVED GRASPING MEANS

(71) Applicant: SIDEL PARTICIPATIONS, Octeville sur Mer (FR)

(72) Inventors: Stephane Morin, Octeville sur Mer (FR); Jose Blanchard, Octeville sur Mer (FR)

(73) Assignee: SIDEL PARTICIPATIONS, Octeville sur Mer (FR)

( * ) Notice: Subject to any disclaimer, the term of this patent is extended or adjusted under 35 U.S.C. 154(b) by 0 days.

(21) Appl. No.: 14/771,935

(22) PCT Filed: Mar. 6, 2014

(86) PCT No.: PCT/EP2014/054332
§ 371 (c)(1),
(2) Date: Sep. 1, 2015

(87) PCT Pub. No.: WO2014/135631
PCT Pub. Date: Sep. 12, 2014

(65) Prior Publication Data
US 2016/0016349 A1    Jan. 21, 2016

(30) Foreign Application Priority Data

Mar. 7, 2013   (FR) ..................................... 13 52054

(51) Int. Cl.
*B65G 47/90* (2006.01)
*B29C 49/42* (2006.01)
(Continued)

(52) U.S. Cl.
CPC ........ *B29C 49/4205* (2013.01); *B25J 15/0047* (2013.01); *B29C 49/06* (2013.01);
(Continued)

(58) Field of Classification Search
CPC .... B29C 49/4205; B29C 49/421; B29C 49/06; B25J 15/0047; B65G 47/90; B29K 2067/003; B29L 2022/00; B29L 2031/7158
(Continued)

(56) References Cited

U.S. PATENT DOCUMENTS

| | | | | |
|---|---|---|---|---|
| 3,405,965 A | * | 10/1968 | Haas | .......................... B66C 1/54 |
| | | | | 294/82.28 |
| 3,479,722 A | * | 11/1969 | Maness | ................... B25B 27/24 |
| | | | | 29/213.1 |

(Continued)

FOREIGN PATENT DOCUMENTS

| | | |
|---|---|---|
| EP | 1 880 825 A1 | 1/2008 |
| WO | 00/48819 A1 | 8/2000 |
| WO | 2011/001358 A2 | 1/2011 |

OTHER PUBLICATIONS

International Search Report, dated Apr. 7, 2014, from corresponding PCT application.

*Primary Examiner* — Dean Kramer
(74) *Attorney, Agent, or Firm* — Young & Thompson

(57) ABSTRACT

A device for transporting a hollow body having a neck including an inner vertical orientation wall and a top edge, the device including elements for grasping the hollow body by engaging with the neck's inner wall, which are mounted at the bottom end of a rod and movably connected to the rod, the rod being movably mounted vertically between a high position and a low position. The grasping elements are movably mounted radially between: a retracted position, in which the grasping elements are inserted vertically, from top to bottom, inside the neck, without contact with the inner wall; and a deployed position, in which the grasping elements engage with the inner wall of the neck, wherein changing the position of the grasping elements from the
(Continued)

retracted to the deployed position is controlled by the vertical movement toward the bottom of the rod, from the high to the low position.

18 Claims, 30 Drawing Sheets

(51) Int. Cl.
  *B29C 49/06* (2006.01)
  *B25J 15/00* (2006.01)
  *B29K 67/00* (2006.01)
  *B29L 22/00* (2006.01)
  *B29L 31/00* (2006.01)

(52) U.S. Cl.
  CPC ........ *B65G 47/90* (2013.01); *B29K 2067/003* (2013.01); *B29L 2022/00* (2013.01); *B29L 2031/7158* (2013.01)

(58) Field of Classification Search
  USPC .................................. 294/93–96; 198/803.12
  See application file for complete search history.

(56) References Cited

U.S. PATENT DOCUMENTS

| | | | |
|---|---|---|---|
| 4,082,175 A | 4/1978 | Gibbemeyer | |
| 4,173,368 A * | 11/1979 | Haverbusch | B66C 1/46 294/100 |
| 4,291,910 A * | 9/1981 | Maupate | B65B 21/12 294/95 |
| 4,340,249 A * | 7/1982 | Bucklew | B66C 1/54 294/195 |
| 4,927,205 A * | 5/1990 | Bowler | B05B 5/08 118/503 |
| 5,190,334 A * | 3/1993 | Sawdon | B25J 15/028 294/119.1 |
| 5,419,427 A * | 5/1995 | Wurgler | B65G 47/908 198/803.12 |
| 7,284,778 B1 | 10/2007 | Pellegatta | |
| 7,452,017 B2 * | 11/2008 | Maffeis | B25J 15/12 279/2.17 |
| 2005/0092892 A1 | 5/2005 | Goss | |
| 2008/0017779 A1 | 1/2008 | Lapert | |
| 2010/0213728 A1* | 8/2010 | Hoellriegl | B65G 47/90 294/87.1 |

\* cited by examiner

DEVICE FOR TRANSPORTING A HOLLOW BODY COMPRISING IMPROVED GRASPING MEANS

This invention relates to a device for transporting a hollow body comprising improved gripping means.

This invention relates more particularly to a device for transporting a hollow body that is equipped with a neck that comprises a vertically-oriented cylindrical inner wall and an upper edge that circumferentially delimits an opening for access to the interior of said hollow body, with said device comprising at least means for gripping the hollow body by engagement with the inner wall of the neck that are mounted at the lower free end of a rod and are movably connected to the rod, with said rod being mounted to move vertically between:

- a top position in which the gripping means are retracted upward by the rod to make it possible to insert the neck of the hollow body radially into a specified reference position relative to the gripping means of the device, and
- a bottom position in which the gripping means engage radially with the inner wall of the neck to ensure the gripping of the hollow body.

Transport devices that comprise means for gripping a hollow body that is equipped with a neck, in particular for gripping a hollow body that is made of thermoplastic material, such as a preform or a container (bottle, flask, jar, etc.), are known from the state of the art.

For the gripping by the necks of such hollow bodies, in particular two types of gripping means are distinguished: on the one hand, the gripping means that engage mainly with the outside of the neck, and, on the other hand, the gripping means that engage only with the inside of the neck of the hollow body.

According to this distinction, the gripping means of the device according to the invention are of the second type, i.e., gripping means that hold the hollow body by the inside of the neck by engaging with the single cylindrical inner wall of the neck, with the outside of the neck being free and detached.

By leaving the outside of the neck free and detached, the gripping means of the second type in particular allow the gripping of the neck by other gripping means, in particular for the purposes of a transfer from the hollow body.

By way of nonlimiting example, such other means consist in, for example, clamps whose jaws engage with the outside of the neck, in particular with an outer threading or an annular groove based on the type of neck. The jaws are accommodated, for example, in an annular groove of the neck that is adjacent to a radial collar, with said groove being, in a known way, designed to accommodate subsequently a tamper-proof ring after the stoppering of the final container.

The document WO0048819 describes an example of a transport device comprising gripping means of the first type, a document to which reference will be made for more details.

By comparison with a transport device according to the first type, the gripping of the hollow body by the inside of the neck with means for gripping a device of the second type is often more difficult to implement. In addition, the inner wall of the neck is smooth, which limits the possibilities of engagement with gripping means.

One of the problems encountered remains the reliability of the gripping that results from the engagement by friction of the gripping means with the inner wall. The gripping means according to the state of the art are in particular very sensitive to the dimensional tolerances that exist on the inner diameter of the neck of the hollow body.

The document EP1880825 describes an example of a transport device of a hollow body that comprises gripping means of the second type that are able to ensure its gripping by the inside of the neck.

The gripping means comprise balls that, designed to engage with the inner wall, are stressed radially toward the outside by elastically deformable O-rings, with said rings being inserted radially between a central core and the balls arranged on the periphery.

In this document, the gripping means have—in the free state, before their insertion inside the neck—an outer diameter that is greater than the inner diameter of the neck.

The gripping means are arranged at the lower end of a rod and are movably connected to the rod, with said rod being mounted to move vertically between a top position and a bottom position.

Gripping is achieved by lowering the rod toward the neck to shrink-on the gripping means there by force, with the contact with the neck stressing the balls that bring about an elastic deformation of said O-rings.

The release is achieved by raising the rod and by exerting by means of an ejector an opposite-direction thrust force on the edge (or rim) of the neck of the preform for extracting said gripping means from it.

In particular because of the injection-molding process of the often different preforms and supply sources, as well as sometimes for the manufacturing of the same container, the inner diameter of the necks in practice often has wide variability that produces problems, in particular when the neck is gripped (operation also called "covering").

The gripping means according to this document have advantageously made it possible to improve the reliability owing to the use of balls that limit the frictional forces during the insertion (or the extraction) of gripping means inside the neck.

However, even if the tolerances with variations of the inner diameter of the neck have been significantly improved relative to the prior art, these tolerances at times remain inadequate and problems then arise during the gripping in particular.

The operation of the gripping means of the transport device according to this state of the art are therefore not fully satisfactory.

In an installation for manufacturing containers from preforms, since the economic consequences of these problems are particularly significant (scraps, degradations of the heating means in the furnace, disruptions and even shutdowns of the manufacturing installation, etc.), solutions are still sought for ways to increase the tolerances of the gripping means with variations of the inner diameters of the necks of the hollow bodies.

The purpose of this invention is in particular to propose a device for transporting a hollow body whose gripping means have a higher tolerance with variations of the inner diameters of the necks, while preserving all of the advantages of speed and simplicity of operation of the transport device according to the state of the art.

For this purpose, the invention proposes a device for transporting a hollow body that is equipped with a neck of the type described above, characterized in that the gripping means are mounted to move radially between:

- a retracted position in which the gripping means are inserted vertically from top to bottom inside the neck, without contact with the inner wall, and a deployed position in which the gripping means engage with the inner wall of the neck, and in that the change in position of the gripping means from the retracted position toward the deployed position is controlled by the downward vertical movement of the rod, from the top position toward the bottom position.

Advantageously, the movement of the rod that controls the change in position from the retracted position toward the deployed position is from the same direction as that of the insertion of the gripping means inside the neck, or vertically downward, from the top position to the bottom position.

For gripping, the insertion of the gripping means and the control of the change in position from the retracted position toward the deployed position are achieved following the same vertical movement of the rod from the top position toward the bottom position.

Conversely for the release, the extraction of the gripping means from the neck and the control of the change in position of the gripping means from the deployed position toward the retracted position are achieved following the same vertical movement toward the top of the rod.

Owing to the control of the change in position of the gripping means by the movement of the rod, the gripping means occupy—during their insertion inside the neck—a retracted position in which said means have an outer diameter that is less than the inner diameter of the neck of the preform.

Advantageously, the insertion inside the neck of the gripping means is therefore done without force, without contact with the inner wall.

By comparison, in the state of the art, the gripping means were in contact with the inner wall during the entire course of insertion resulting from the lowering of the rod. Actually, the neck stresses the balls against elastically deformable O-rings to cause the reduction of the outer diameter, since this outer diameter is initially greater than the inner diameter of the neck.

The O-rings have an essential role in the operation of the state of the art EP-1,880,825.

According to a first case depicted ("narrow neck"), the deformation of the O-rings can—because of the inner diameter of the neck and tolerances on the latter—be inadequate so that the gripping means can be inserted vertically completely inside the neck. Such a fault in gripping the neck can have various consequences.

First, this fault leads to incorrect positioning of the preform whose axis does not extend vertically but with a given slope, in particular because of the absence of engagement of the stop of the base with the edge of the neck and the swiveling contact of the balls with the inner wall.

In the case of an individual preform transport device equipping a furnace, the body of a thus inclined preform is then likely to cause damage by coming into contact with the heating means, such as infrared lamps.

Next, even if the preform extends vertically, the vertical position of the neck is then incorrect relative to gripping means designed to grip it by the neck or, for taking again the above-mentioned example application in a furnace, induces an incorrect positioning of the neck relative to the cooling means and/or the means for protecting the neck, and this also applies for the body relative to the heating means of the furnace.

According to a second case depicted ("wide neck"), if, because of the inside diameter of the neck and tolerances with regard to the latter, the deformation of the O-rings is inadequate, then the force applied by the balls on the inner wall of the neck may also be inadequate. Such a fault in gripping the neck can have various consequences.

For example, driving the preform in rotation on itself during the thermal conditioning of its body can be disrupted in the event that there is sliding between the balls and the inner wall for taking again the above-mentioned example application of the transport device in a furnace.

The transport device according to the invention advantageously resolves these problems sometimes encountered with a device according to the state of the art EP-1,880,825 while preserving, however, the operational characteristics and in doing so the speed and the simplicity, in particular for carrying out the gripping of the neck.

Actually, the control of a change in position of the gripping means of the device according to the invention is achieved simultaneously with the end of the vertical movement of the rod in the direction of the neck. The gripping is achieved automatically in one and the same movement of the rod in the direction of the neck.

Advantageously, after retraction of the gripping means vertically upward, the hollow body and the transport device are able to be positioned relative to one another so that the hollow body occupies a specified reference position in which the neck is vertically aligned relative to the gripping means, following the main axis of the transport device.

By comparison with the state of the art, the gripping means are controlled selectively by means of the rod for occupying one of the retracted or deployed positions, with the gripping means being controlled toward their deployed position by the downward vertical movement of the rod.

Advantageously, the release of a hollow body that is oriented "neck up" is achieved simply by gravity; actually, the raising of the rod controls the return of the gripping means to the retracted position, thus releasing the hollow body that until then was suspended by its neck.

Owing to the control of the gripping means, the ejector can advantageously be eliminated.

According to the other characteristics of the invention:
the device comprises a body relative to which the rod, called the control rod, is mounted to move vertically, at least one vertical return element to push the control rod toward its bottom position and actuating means to drive the control rod toward its top position against said return element;
the device comprises an intermediate support part of the gripping means that is movably connected to the control rod and that is mounted to move vertically relative to the control rod, and an intermediate element for return toward the bottom of said intermediate part;
the return element of the control rod and the intermediate return element of the intermediate part are mounted in series by means of a support element and the calibration of the return element of the control rod is greater than the calibration of the intermediate return element of the intermediate part;
the device comprises stop means that determine vertical travel between the intermediate part and the control rod;
the device comprises at least the first stop means that are involved in movably connecting the intermediate part to the control rod when the control rod is moved vertically upward;
the intermediate part comprises a control stop that can bring about an upward relative movement of the intermediate part relative to the control rod against the intermediate return element;

the intermediate part comprises a control stop that is able to engage with the edge of the neck to bring about an upward relative movement of the intermediate part relative to the control rod, against the intermediate return element;

the intermediate return element of the intermediate part is able to exert an assist force on the edge of the neck vertically downward;

the device comprises means for locking gripping means in the deployed position;

the device comprises at least second stop means that, when the control rod is moved vertically downward, are located between the intermediate stop part and the control rod to position said locking means vertically;

the intermediate part comprises a stop that can engage with a face of a support for bringing about an upward relative movement of the intermediate part relative to the control rod, against the intermediate return element;

the device comprises an ejector that has a support face that is designed to engage with the edge of the neck to immobilize the neck vertically upward when the control rod is moved vertically upward;

the device comprises a stop that, being able to move against a return spring downward, is able to engage with the intermediate part for immobilizing vertically said intermediate part when the control rod is moved vertically upward;

the control rod comprises a control surface that, during the downward vertical movement of the rod, engages with the gripping means for bringing about a radial movement of the gripping means from the retracted position toward the deployed position;

the gripping means comprise at least transmission means, at least one radially deformable elastic element, and elements for gripping the hollow body comprising an outer surface that is designed to engage in the deployed position with the inner wall of the neck;

the transmission means comprise at least balls that, during the change in position of the gripping means toward the deployed position, engage with the control surface of the rod, and said balls are accommodated in a groove of the control rod that forms said locking means of the gripping means in the deployed position;

said at least one radially deformable elastic element is a wavy spring designed to stress the gripping means radially, and the transmission means comprise a ring that is inserted radially between the balls and said spring;

said at least one radially deformable elastic element is an annular ring made of elastomer material that is inserted radially between the transmission means and the gripping elements;

the gripping elements of the hollow body are formed by a ring that, formed by at least two sectors, is made of a metal material;

the gripping means are formed by pads radially comprising on the inside an inclined face that is designed to engage with the control surface of the control rod;

said pads forming the gripping means and the control rod are magnetized for automatically returning the pads toward the retracted position.

Other characteristics and advantages of this invention will emerge from reading the detailed description that will follow for the understanding of which reference will be made to the drawings in which.

Figure 1:
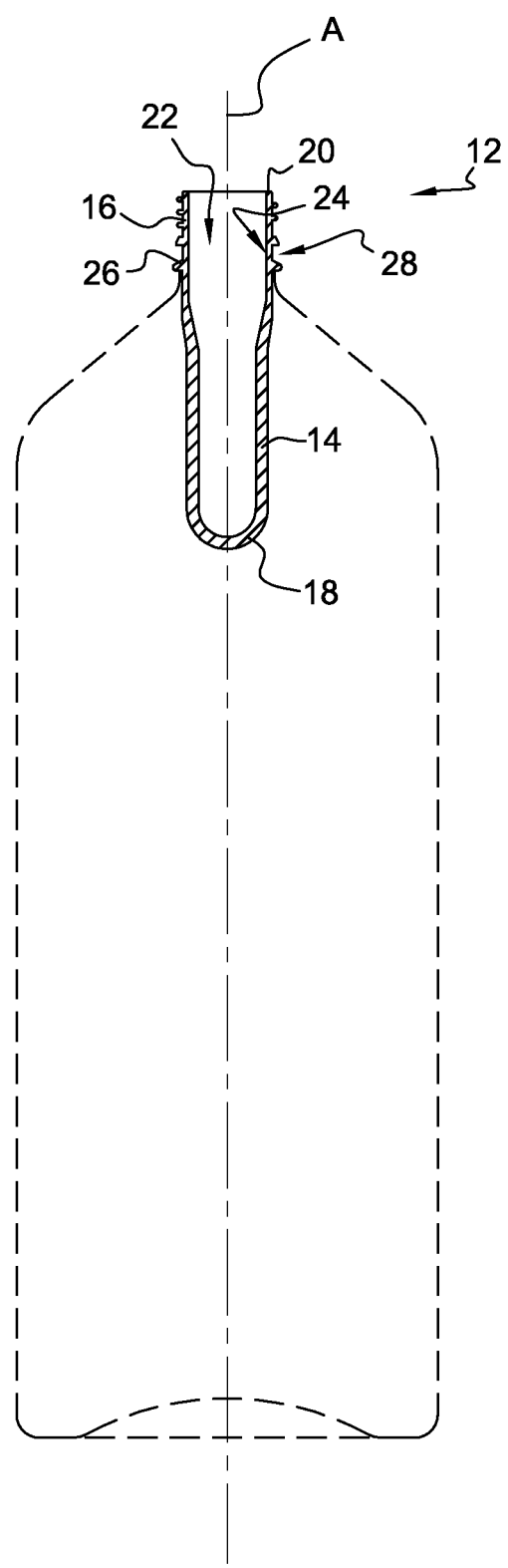
FIG. 1 is a vertical cutaway view that shows an example of a hollow body equipped with a neck and according to this example illustrates a preform as well as, in dotted lines, the silhouette of a container (bottle) that can be manufactured from such a preform made of thermoplastic material.
Figure 29:
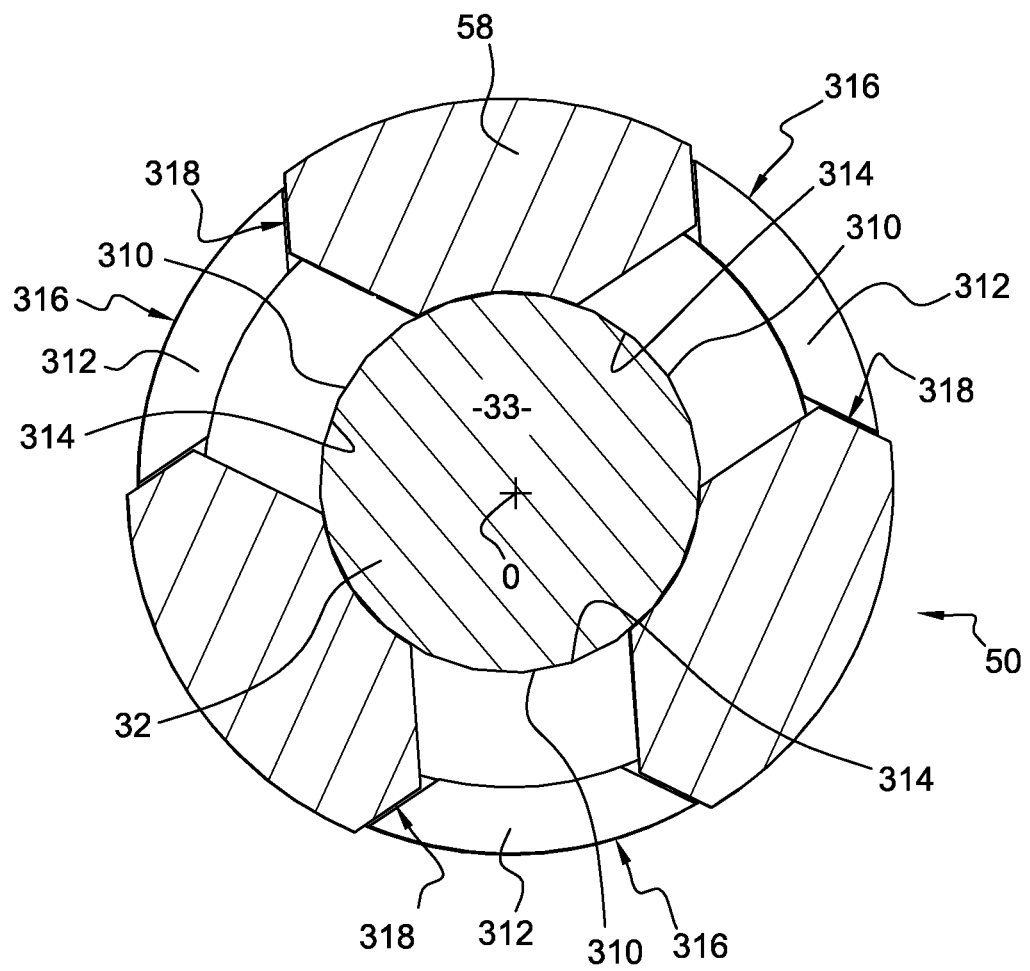
Figure 30:
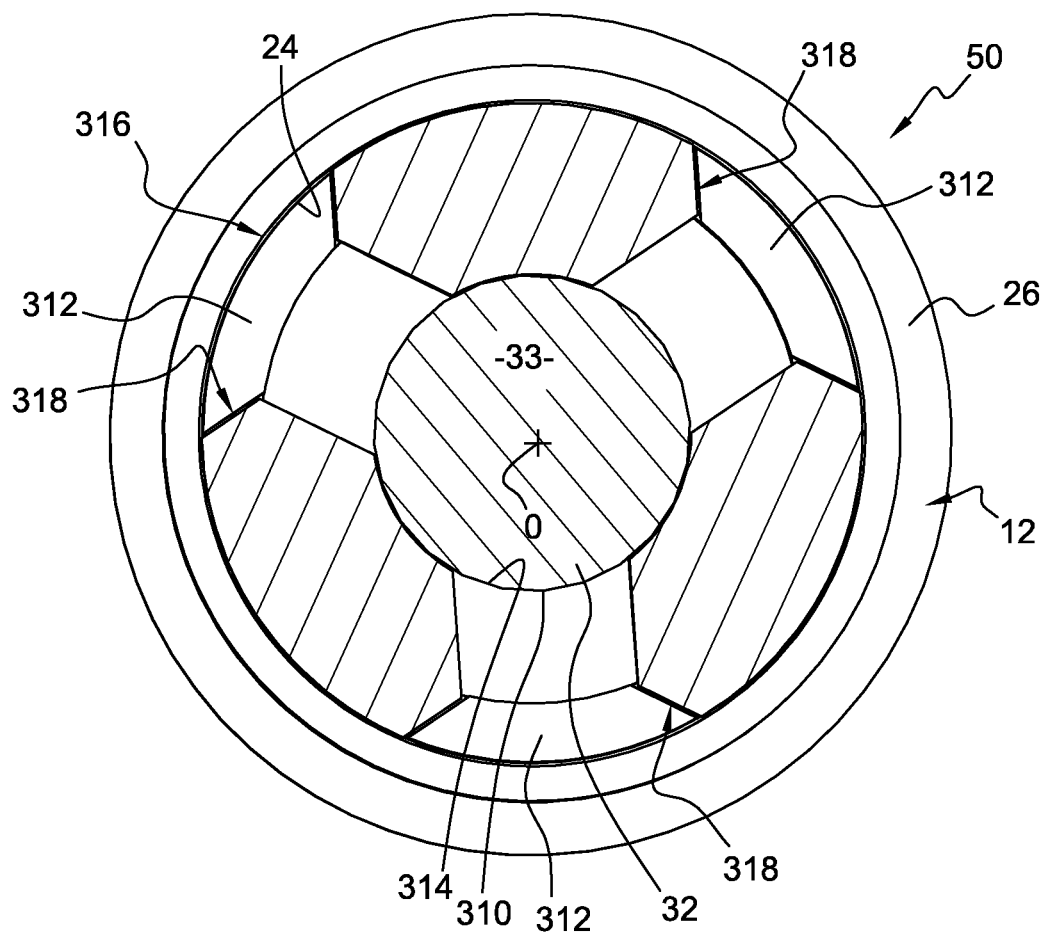

FIGS. 17 to 23 are cutaway views that show a transport device according to a second embodiment that, without an ejector, comprises gripping means that are identical to the first and that illustrate the operating positions that are successively occupied for implementing the gripping and then the release of a hollow body that is equipped with a neck such as a preform or a container according to FIG. 1;

FIGS. 24 to 28 are cutaway views that show a transport device according to a third embodiment and that illustrate the operating positions that are successively occupied for implementing the gripping and then the release of a hollow body that is equipped with a neck such as a preform or a container according to FIG. 1;

FIGS. 29 and 30 are respectively radial cutaway views that show in detail the gripping means according to the third embodiment and that respectively illustrate said gripping means in the retracted position and in the deployed position inside a neck.

In the description below, the "vertical" orientations along the axis X of the device and the "radial" orientations orthogonally to said axis will be adopted by way of nonlimiting example and to facilitate the comprehension thereof, with the "vertical" orientation being given arbitrarily without reference to Earth's gravity.

By way of nonlimiting example, the terms "top" or "bottom" as well as "higher" or "lower" with reference to the vertical orientation and "outside/outer" or "inside/inner" with reference to the radial orientation and relative to the axis O for the transport device or the axis A for the hollow body will be used.

FIGS. 2 to 10 show a device 10 for transporting a hollow body according to a first embodiment of the invention.

A transport device 10 according to the invention is used in particular for individually transporting a hollow body that is formed by a preform 12 in a furnace (not shown) of a container manufacturing installation.

FIG. 1 shows, in a vertical cutaway, a nonlimiting embodiment of a preform 12 made of thermoplastic material that is designed to be transformed into a container, such as a bottle that is shown in dotted lines.

The preform 12 that is made of thermoplastic material such as PET is, for example, thermally conditioned in the furnace of the installation, and this prior to its transformation into a container that is produced by blow molding (or stretch-blow molding) of said preform in a mold by means of at least one pressurized fluid.

It is recalled that a preform 12 is generally manufactured by injection of thermoplastic material into a mold and that the preform 12 that is obtained comprises a neck with its definitive shape, i.e., identical to that of the final container.

Consequently, a transport device 10 is able to ensure, for a given neck, the gripping of either the preform 12 or of the final container, owing to which the transport device 10 according to the invention can be used throughout such an installation.

As will have been understood, the use of a transport device 10 according to the invention is therefore in no way limited to that of a preform, moreover not that of preforms in a furnace that constitute respectively only one example.

As shown in FIG. 1, the preform 12 comprises a body 14 that is equipped at one end with a neck 16 and closed at the opposite end by a bottom 18. The preform 12 has a main axis A that extends here in the vertical direction.

The neck 16 comprises an edge 20 that circumferentially delimits an opening 22 for access to the inside of the hollow body 14 of the preform 12 and comprises an inner wall 24. In FIG. 1, said inner wall 24 is cylindrical and extends vertically in a rectilinear manner with an essentially constant inner diameter.

As a variant, the inner wall 24 of the neck 16 is slightly inclined relative to the vertical and/or the inner wall 24 is staged, with a variation of the inner diameter.

In the embodiment shown in FIG. 1, the neck 16 comprises a collar 26 that extends radially toward the outside, projecting relative to the body 14, and which vertically delimits a joining area of the neck 16 with the body 14.

According to this example, the neck 16 comprises on the outside a threading that is designed to make possible the subsequent closing of the container by a matching screw cap and also comprises an annular groove 28 that is designed to accommodate a tamper-proof ring.

In the case of the particular application to the transport of a preform 12 in the furnace of a container manufacturing installation, the neck 16 having its definitive shape, only the body 14 of the preform 12 is heated by heating means for the purpose of softening its constituent material.

Figure 2:
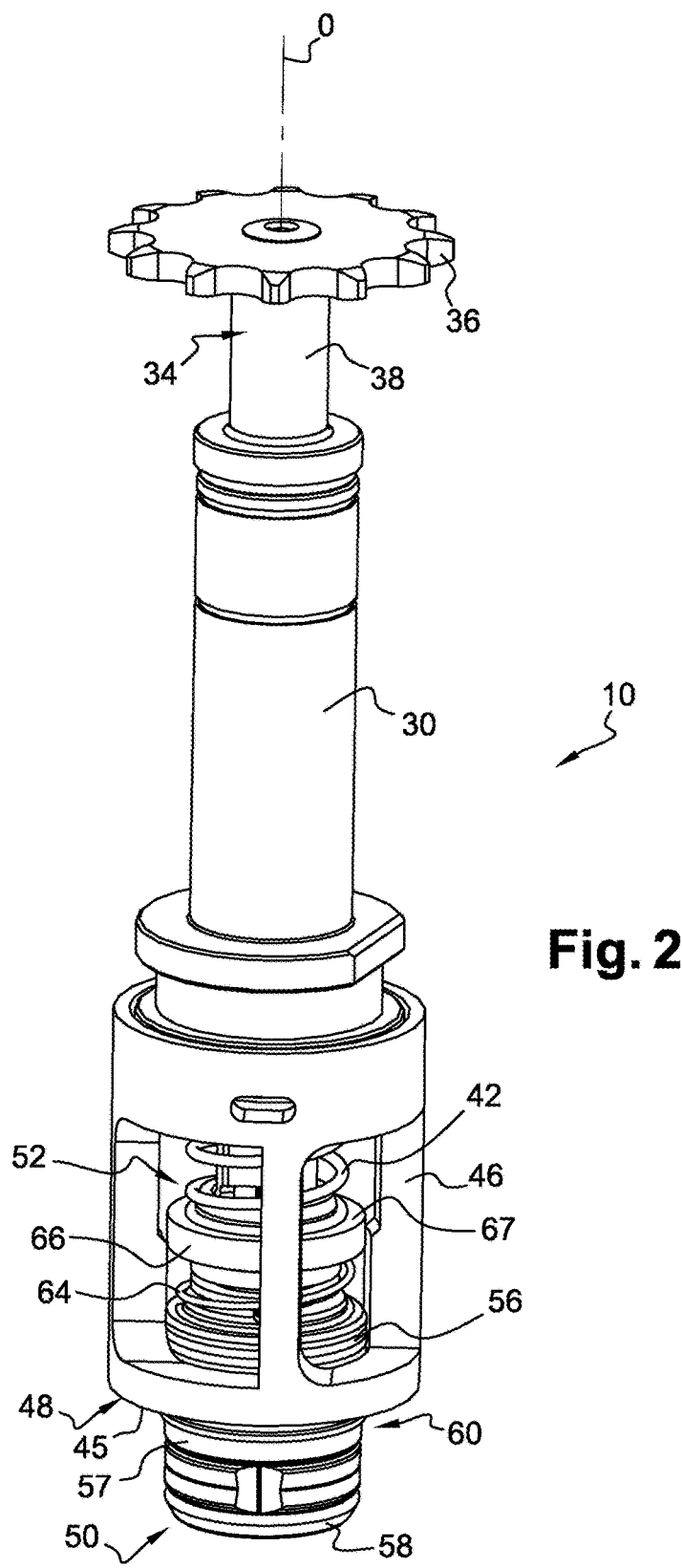
FIG. 2 is a perspective view that shows a transport device comprising gripping means according to a first embodiment of the invention.
Figure 3:
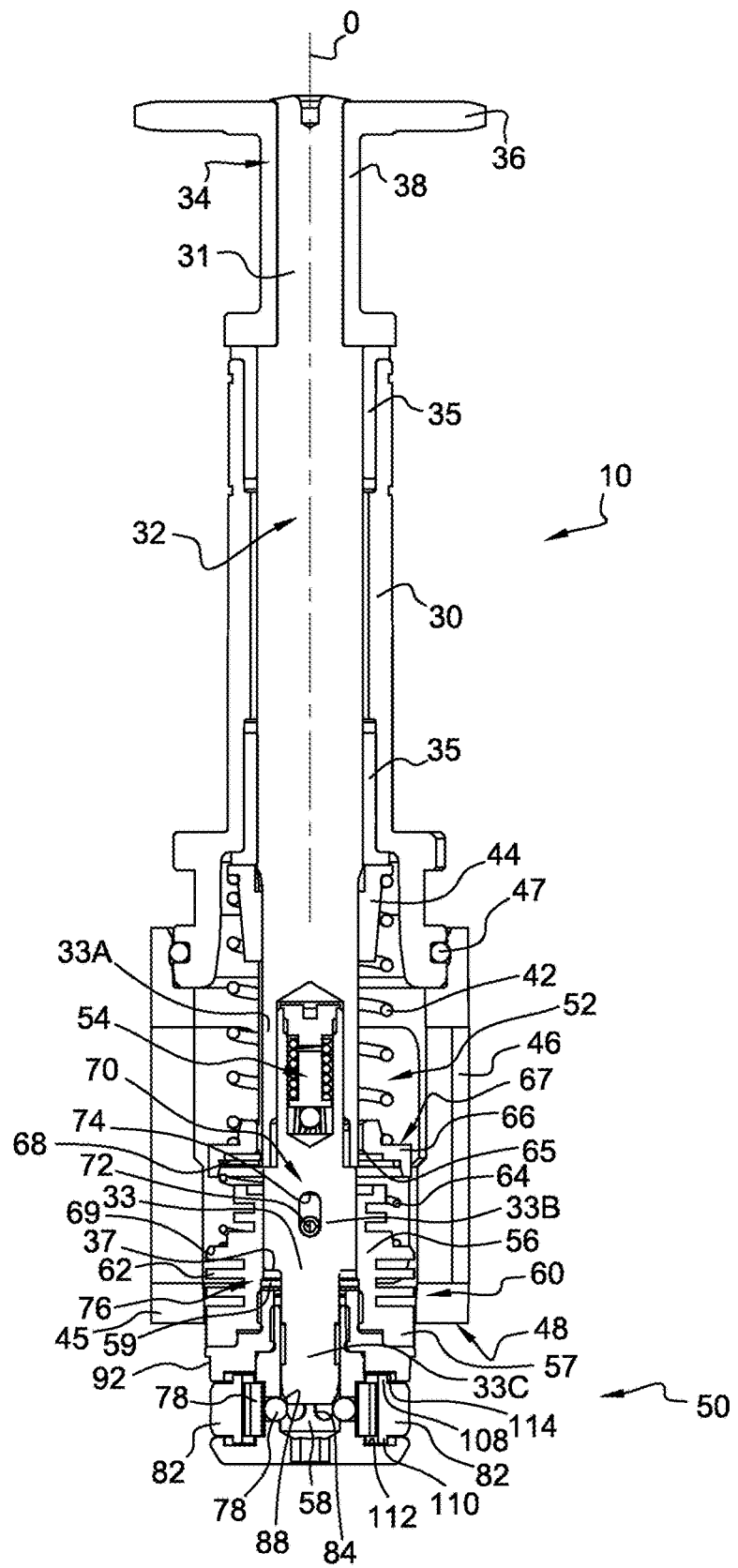
FIGS. 3 to 8 are cutaway views that show a device according to FIG. 2 and that illustrate the operating positions that are successively occupied for implementing the gripping and then the release of a hollow body that is equipped with a neck such as a preform or a container according to FIG. 1.

As shown in particular in FIGS. 2 and 3, the transport device 10 comprises a body 30, in particular able to be movably connected to a transport system, such as a chain or a belt, in such a way as to be driven to perform a specified heating pass inside the furnace.

The transport device 10 comprises at least one rod 32, a so-called control rod, which is mounted to move vertically relative to the body 30 following the axis O of the transport device 10.

The transport device 10 comprises a part 34 for driving the control rod 32.

The driving part 34 is penetrated through its center by an upper portion 31 of the rod 32 that, with a smaller cross-section than that of the part of the rod 32 that slides vertically in the body 30, delimits a shoulder for said driving part 34.

The driving part 34 is movably connected to said rod 32, on the one hand vertically, and, on the other hand, in rotation around the main axis O of the transport device.

Advantageously, small cushions 35 are inserted between the body 30 and the rod 32, respectively at each upper and lower end of the body 30.

Overall in a vertical section, the driving part 34 has a "T" shape and respectively comprises a radially-oriented part from which another vertically-oriented part extends downward.

The radial part is formed by a pinion 36 that circumferentially comprises a set of teeth designed to engage with mating engagement means for driving the rod 32 in rotation around the axis O.

The pinion 36 has as its function, by means of the rod 32, to drive in rotation on itself the preform 12 transported individually by the device 10.

Such a function is applied in particular in the furnace of a container manufacturing installation and is designed to improve the thermal conditioning of the preform 12 that is thus driven onto itself inside the furnace over at least a part of the heating pass. In addition, this is why such a transport device 10 is sometimes also called a "spinner."

The vertical part 38 of the driving part 34 of the rod 32 forms a hub that is designed to engage with associated actuating means 40.

The actuating means 40 are designed to control selectively the vertical movement of the control rod 32, with said rod 32 being mounted to slide relative to the body 30.

The actuating means 40 of the rod 32 comprise, for example, a fork that engages with the hub 38 to move it vertically and that is controlled selectively for this purpose by an actuator, such as a cam and roller mechanism.

In the figures, the actuating means 40 of the rod 32 are shown diagrammatically by an arrow and only when the rod 32 is moved vertically upward and/or downward by said means 40.

Advantageously, the rod 32 is mounted to move vertically along the axis O between at least a first position, a so-called bottom position, and a second position, a so-called top position.

Preferably, the rod 32 is mounted to move vertically upward against a return element 42 of the rod formed here by, for example, a spring.

Based on the force that is applied by the actuating means 40 on the hub 38 of the driving part 34, the spring 42 automatically returns the control rod 32 to the bottom position.

The actuating means 40 only control the vertical movement of the rod 32 from the bottom position toward the top position by exerting on the rod 32 a traction force that is greater than the return force exerted by the spring 42.

Advantageously, the downward vertical movement of the rod 32, from the top position toward the bottom position, is achieved automatically owing to the return spring 42 of the rod by ceasing to apply said fraction force on the driving part 34.

As a variant, in the absence of such a return spring 42 of the rod 32, the actuating means 40 then control the vertical movement of the rod 32 toward one and the other of said bottom and top positions.

The return spring 42 of the rod extends vertically around the rod 32 that penetrates through its center; the upper end of the spring 42 rests on a ring 44 that is also penetrated by the rod 32. The ring 44 is immobilized vertically upward relative to the body 30, with said ring 44 resting here on the small lower cushion 35.

The transport device 10 comprises an ejector 46 whose upper end is securely connected onto the body 30, for example here by elastic interlocking by means of a joint 47.

At its lower end, the ejector 46 comprises a circumferentially continuous edge 45 that comprises a support face 48, with said support face 48 advantageously being flat and extending radially.

The support face 48 of the ejector 46 is designed to engage with at least a part of the edge 20 of the neck 16 and becomes involved during the release of the preform 12.

Advantageously, the ejector 46 is a part that is easily and quickly detachable to be, if necessary, changed, in particular for the manufacture of another container whose neck has different diameter characteristics.

The transport device 10 comprises gripping means referred to in a general manner by the reference 50 and designed to engage with the inner wall 24 to ensure the gripping of the hollow body by the inside of the neck 16, here the individual gripping of the preform 12.

As illustrated in FIG. 2, the ejector 46 is a cylindrical part that, locally perforated, delimits a housing 52 inside of which are accommodated all or part of the means 50 for gripping the transport device 10.

Figure 4:
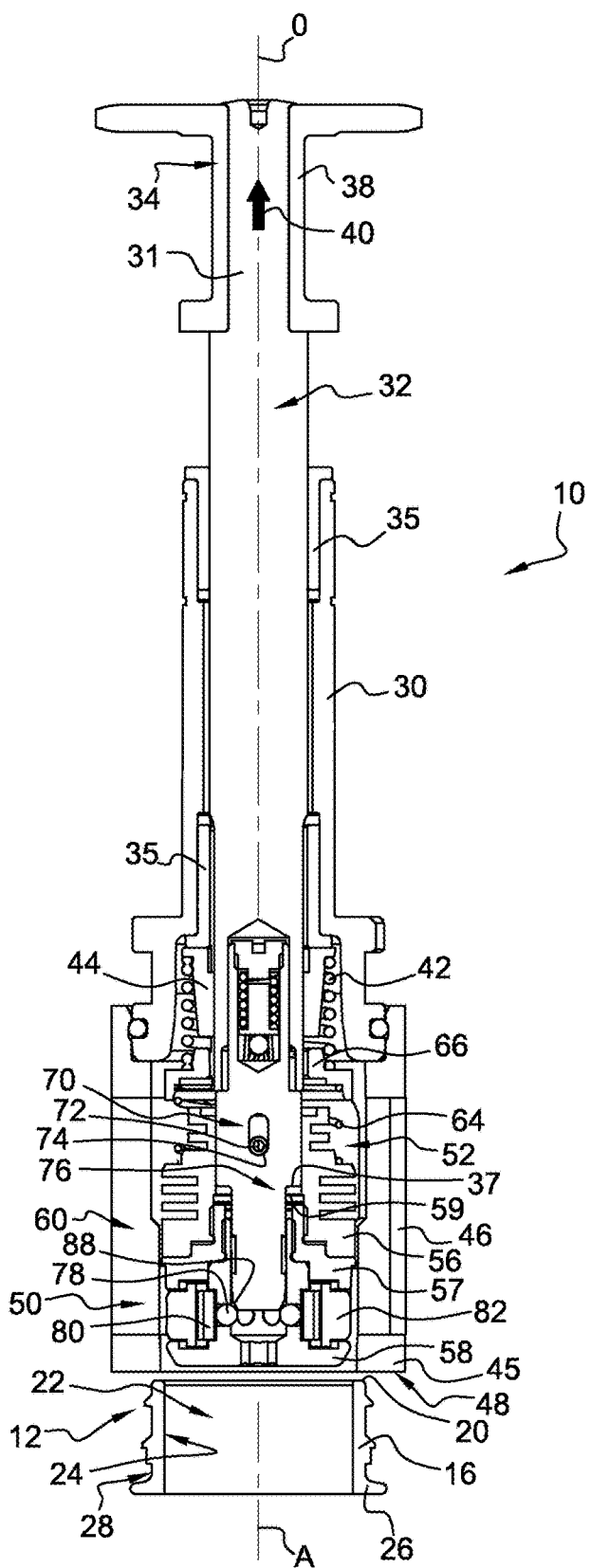
Figure 5:
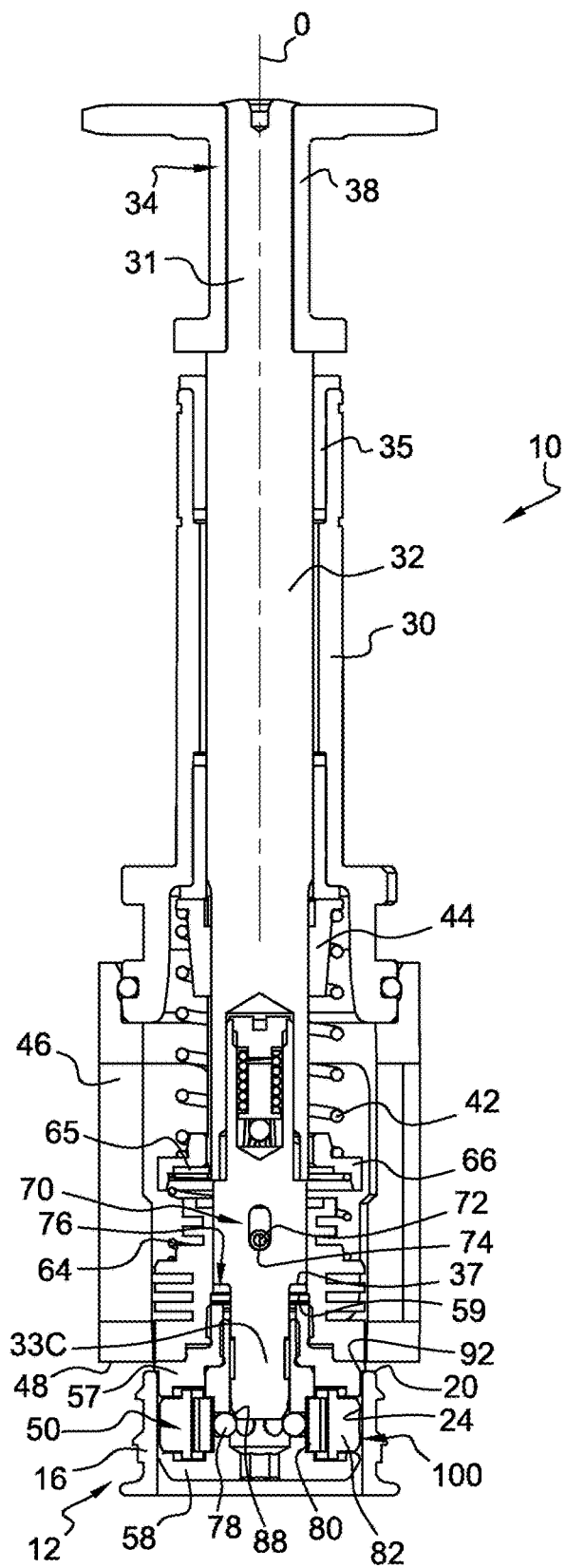

Based on the vertical position of the rod 32, the gripping means 50 are retracted inside the housing 52 (FIG. 4) or are partially projecting, vertically beyond the support face 48 of the ejector 46 (FIG. 3 or 5).

The gripping means 50 are mounted at the lower end of the control rod 32 and are movably connected vertically to the rod 32 with a possibility of a given travel in the vertical direction.

The gripping means 50 are entrained vertically upward by the control rod 32 moved toward its top position; the retraction of the gripping means 50 has in particular as its object to make possible the radial insertion of the neck 16 of the preform 12 into a specified reference position relative to the transport device 10 and more particularly relative to said gripping means 50.

The specified reference position of the neck 16 corresponds to a position in which the neck 16 is aligned vertically relative to the gripping means 50, with the axis A of the preform 12 advantageously being merged with the main axis O of the transport device 10.

With the preform 12 being in said reference position and oriented in a so-called "neck up" position in which the body 14 extends vertically below the neck 16, the neck 16 is then placed vertically below, perpendicular to the gripping means 50.

Owing to the retraction of the gripping means 50, the neck 16 can be placed to occupy said reference position without there being any interference between the neck 16 and the gripping means 50.

Figure 6:
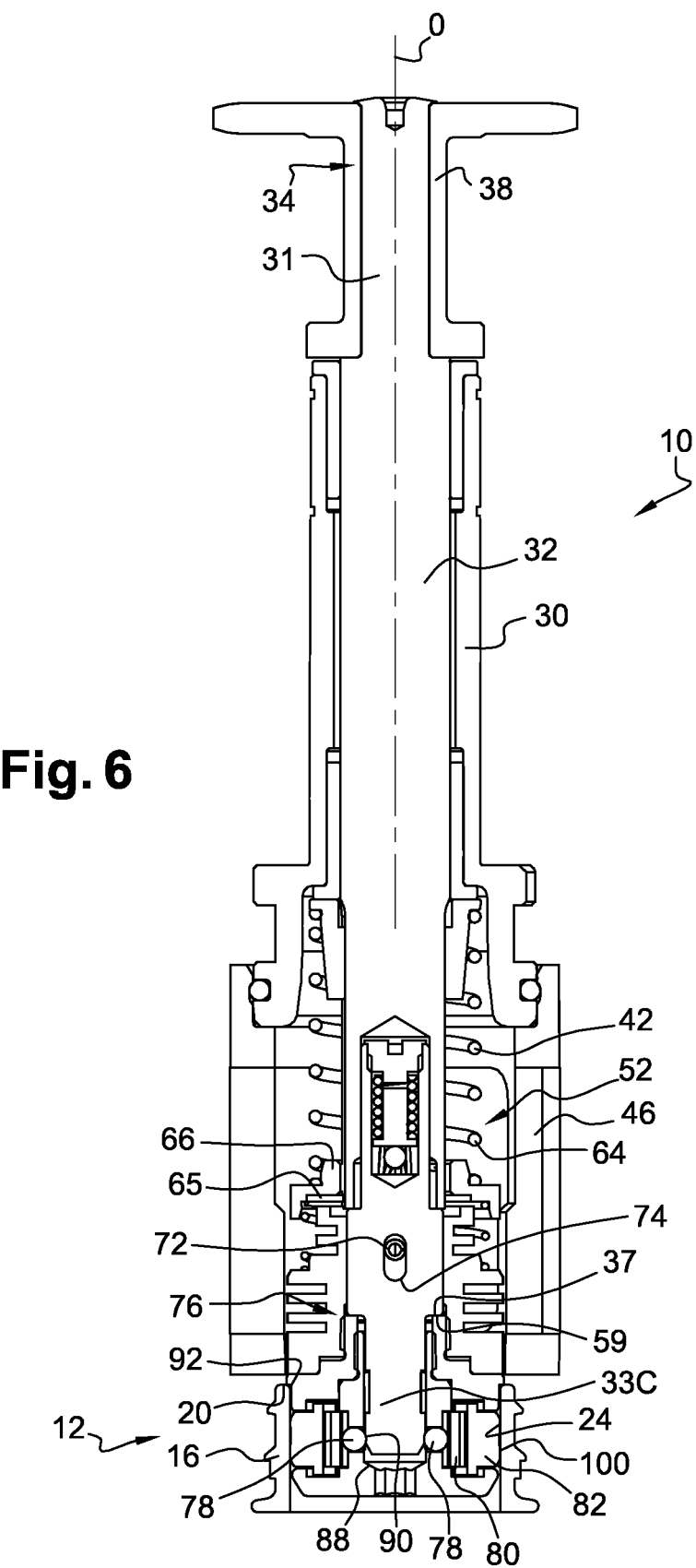

As illustrated in FIG. 6, the edge 20 of the neck 16 is in said specified reference position advantageously located near the support surface 48 of the ejector 46.

Advantageously, the vertical travel of the rod 32 for implementing both the gripping and the release of the preform 12 by the gripping means 50 is reduced by the same token.

In the bottom position of the rod 32, the gripping means 50 engage radially with the inner wall 24 of the neck 16 to ensure the gripping of the preform 12.

Preferably, the rod 32 is made in two parts, respectively a first part comprising the upper portion 31 that remains mounted in the body 30 of the transport device 10 and a second lower part 33.

Advantageously, the second lower part 33 is detachable so as to make possible a change in the gripping means 50 based on the characteristics of the neck 16 of the hollow body whose gripping is to be implemented.

The lower part 33 of the rod 32 is staged and respectively comprises an upper segment 33A, an intermediate segment 33B, and a lower segment 33C.

Preferably, connecting means 54 make it possible to carry out, quickly and simply, the disassembly like the assembly of gripping means 50 on the transport device 10.

Advantageously, the lower part (also called "spinner nose") that functionally comprises the gripping means 50 of the neck 16 is thus the only part to be changed.

Figure 10:
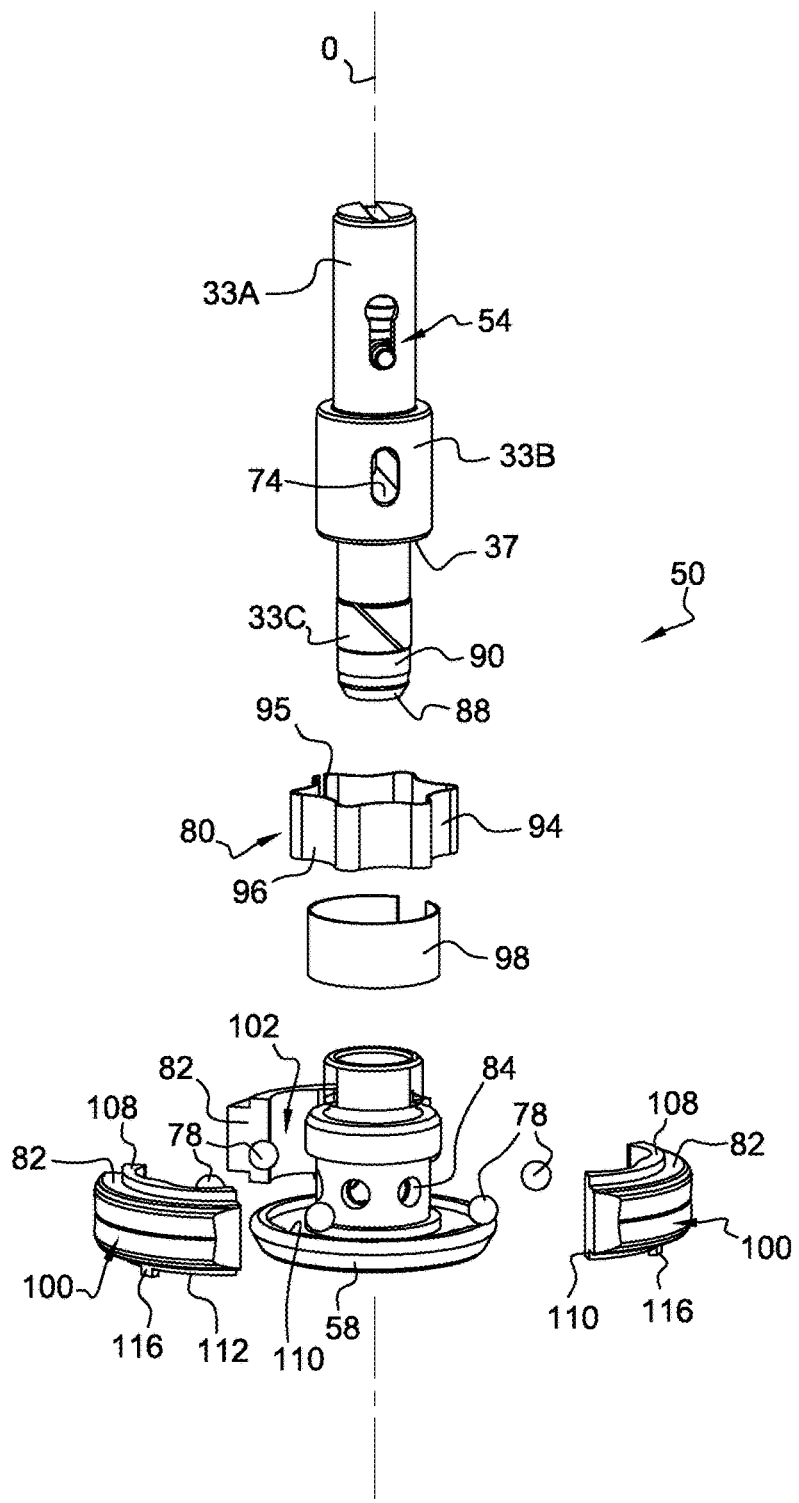

The connecting means 54 are, for example, of the bayonet type here, with said connection means 54 being carried by the segment 33A of the lower part of the rod 32 (see FIG. 10).

The segments 33A and 33C have a cross-section that is smaller than that of the intermediate segment 33B, with a shoulder 37 being formed at the junction between the intermediate segment 33B and the lower segment 33C.

In accordance with the invention, the gripping means 50 are mounted to move radially between:

a retracted position in which the gripping means 50 are inserted vertically from top to bottom inside the neck 16, without contact with the inner wall 24, and a deployed position in which the gripping means 50 engage with the inner wall 24 of the neck 16, and the change in position of the gripping means 50 from the retracted position toward the deployed position is controlled by the downward vertical movement, from the top position toward the bottom position, of the rod 32, so-called control rod.

Advantageously, the gripping means 50 are able to occupy the deployed or retracted positions that are positions controlled selectively by the movement of the rod 32, with said downward vertical movement corresponding to the direction of insertion of the gripping means 50 inside the neck 16.

By comparison, the gripping means according to the state of the art are not mounted to move radially between two positions that are controlled selectively.

Actually, the gripping means according to the state of the art are able to occupy two states, a first free state occupied outside of the neck and a second compressed state occupied inside of the neck.

In the first free state occupied outside of the neck, the gripping means have an outer diameter that is greater than the inner diameter of the neck. In the second compressed state occupied inside the neck, the gripping means engage with the inner wall of the neck following their deformation, caused by the neck, during their shrinking-on by force by the rod inside said neck.

Advantageously, the downward vertical movement of the rod 32 for controlling the change in position of the gripping means 50 from the retracted position toward the deployed position is done in the same direction as that of the insertion of the gripping means 50 inside the neck 16.

For this reason, the downward vertical movement of the rod 32 that inserts the gripping means 50 inside the neck 16 and that controls at the end of travel the change in position of said gripping means 50, and at almost the same time as they are inserted, is a continuous movement.

In the same manner, the upward vertical movement of the rod 32 controls the change in position of the gripping means 50 from the deployed position toward the retracted position for carrying out the release of the preform 12.

The device 10 comprises at least an intermediate support part of the gripping means 50 that is carried by the rod 32, more specifically the lower part 33, and that is mounted to move vertically with a given travel relative to the control rod 32.

Arbitrarily, said at least one intermediate part is referred to below by the general reference 60. Preferably, said at least one intermediate part 60 is made in several parts.

In this first embodiment, for example, the intermediate part 60 comprises three parts, an upper part 56, a lower part 58, and a part 57 forming a crosspiece that is inserted vertically between said upper part 56 and lower part 58.

The part 57, hereinafter the crosspiece, ensures the connection between said upper part 56 and lower part 58 that are vertically integral upon movement with one another.

The lower segment 33C of the rod 32 passes through the crosspiece 57 vertically, and the crosspiece comprises an upper edge delimiting a stop face 59.

Advantageously, the upper part 56 comprises thermal dissipation means 62, such as fins, for evacuating to the air the heat transmitted to the gripping means 50 when they are used for the transport of a preform 12 inside a thermal conditioning furnace.

The intermediate part 60, here by the upper part 56, is mounted to move vertically relative to the control rod 32 against an intermediate elastic return element 64.

The intermediate return element 64 of the part 60 is inserted vertically between said upper part 56 of the intermediate part 60 and a support element 66.

Preferably, the support element 66 is made in the form of a cup through whose center the rod 32 passes and that is free to move vertically relative to the rod 32.

The cup 66 is stressed continuously vertically downward by the spring 42 against a lower stop 65 that is formed by, for example, a slit elastic ring that is integral with the rod 32.

Advantageously, the support cup 66 is inserted vertically between the return spring 42 of the control rod 32 and the intermediate return element 64 of said part 60.

The calibration of the spring forming the return element 42 of the control rod 32 is better than the calibration of the intermediate return element 64 of the intermediate part 60.

The intermediate return element 64 of said part 60 consists of, for example, a spiral spring and will be referred to hereinafter as the intermediate spring 64.

The support cup 66 is respectively stressed by the lower end of the return spring 42 of the control rod 32 that rests on an upper face 67 of the cup 66 and by the upper end of the intermediate return spring 64 of the intermediate part 60 that rests on a lower opposite face 68 of the cup 66.

The lower end of the intermediate return spring 64 of the intermediate part 60 rests on a shoulder 69 that the upper part 56 of said intermediate part 60 comprises.

The device 10 comprises stop means that, located between the control rod 32 and the intermediate part 60, determines vertically the travel between the two parts upward and/or downward.

Preferably, said stop means comprise first stop means 70 that, forming a low stop, determine the position of the part 60 relative to the control rod 32 when said rod 32 is moved vertically upward toward its top position.

The first stop means 70 become involved in movably connecting the intermediate part 60 to the control rod 32 when the rod 32 is moved vertically upward.

The device 10 comprises connecting means 72 in rotation with the lower part 33 of the control rod 32 and the intermediate part 60, here, the upper part 56 of the intermediate part 60.

Preferably, the connecting means 72 in rotation are formed by a pin that respectively passes through the intermediate segment 33B of the lower part 33 of the rod 32 and the upper part 56 of the intermediate part 60.

The intermediate segment 33B of the lower part 33 of the rod 32 comprises a hole 74 through which the rotating connecting pin 72 passes with play and has an oblong shape vertically.

Preferably, a lower end of the hole 74 forms said first stop means 70 by engagement with the pin 72.

Preferably, said stop means comprise second stop means 76 that, forming a top stop, determine the position of the part 60 relative to the control rod 32 when said rod 32 is moved vertically downward for gripping the neck 16 of a preform 12.

The second stop means 76 are formed by means that are separate from those forming the first stop means 70.

As a variant, the second stop means 76 are formed by the pin 72 and the hole 74, with the pin 72 then abutting against the upper edge of the hole 74 that is vertically opposite to the lower edge against which the pin 72 abuts to form the first stop means 70.

Preferably, the second stop means 76 are obtained by the abutment of the shoulder 37 of the lower part 33 of the rod 32 against the stop surface 59 formed by the upper edge of the crosspiece 57 in the intermediate part 60.

When the control rod 32 is moved vertically downward, the second stop means 76 are located between the intermediate stop part 60 and the control rod 32, in particular for positioning vertically locking means 90 that will be described subsequently.

The gripping means 50 according to the first embodiment, which are more particularly illustrated by FIGS. 4 and 5, will now be described.

The gripping means 50 comprise, radially from the inside to the outside, at least transmission means, radially deformable elastic means 80, and gripping elements 82.

The transmission means comprise at least balls 78 that are distributed circumferentially in a uniform manner and are accommodated in the housings 84 formed in the lower part 58 of the intermediate part 60.

The lower part 58 forms a cage for the balls 78.

Preferably, the balls 78 are made of a metal material, such as steel.

The vertically-oriented upper part of lower part 58 comprises at its center a housing 86 in which the lower segment 33C of the control rod 32 moves vertically.

Preferably, the lower segment 33C of the control rod 32 comprises a control surface 88 that is designed to engage with the balls 78 to stress them radially toward the outside, from the retracted position toward the deployed position of the gripping means 50.

Advantageously, the control surface 88 that is carried by the rod 32 is a truncated cone-shaped surface.

Advantageously, the device 10 comprises means 90 for locking in position gripping means 50 that can keep the gripping means 50 in the deployed position.

Otherwise, the return force exerted vertically downward by the intermediate return spring 64 of the intermediate part 60 would bring about a change in position of the gripping means 50 toward the refracted position because of the downward movement of the intermediate part 60 relative to the rod 32.

Advantageously, the intermediate part 60, here the crosspiece 57, comprises a shoulder that forms a control stop 92 that is designed to engage with at least one part of the edge 20 of the neck 16.

When the gripping means 50 are moved vertically downward in the direction of the neck 16 with the control rod 32, the control stop 92 abuts against the edge 20 and then brings about an upward relative movement of the intermediate part 60 relative to the control rod 32 and this against the intermediate return spring 64 of the intermediate part 60.

This relative movement is made within the limits of travel specified by the second stop means 76.

In reaction to the compression that follows, the intermediate spring 64 stresses the intermediate part 60 with a return force that is oriented vertically downward.

Preferably, the locking means consist of an annular groove 90 that is made in the lower segment 33C of the control rod 32, vertically above the truncated cone-shaped control surface 88.

As a variant, the device 10 comprises locking means controlled selectively for vertically immobilizing the control rod 32 in its bottom position.

In this first embodiment, the elastic means 80 are formed by an annular spring that, consisting of a metal blade, is circumferentially wavy.

The spring 80 is open and comprises an edge 95 at each of its ends that come around and face each other.

The wavy spring 80 circumferentially comprises alternating convex portions 94 and concave portions 96 respectively forming waves, with said portions 94, 96 respectively extending relative to the vertical axis O radially toward the outside and radially toward the inside.

Advantageously, the transmission means comprise a ring 98 that is inserted radially between the balls 78 and the spring 80. The ring 98 is slit to make it possible for it to deform, and it opens to a greater or lesser extent to vary its circumference during operation.

The ring 98 is respectively in contact radially on the inside with the balls 78 and on the outside with the concave portions 96 of the spring 80. The balls 78 are aligned radially on the convex portions 94 of the spring 80.

The gripping elements 82 are formed by a ring that radially comprises an outer face 100 that is designed to engage with the inner wall 24 of the neck 16 in the deployed position.

Advantageously, the ring 82 is made of metal, for example of stainless steel (advantageously impervious to corrosion or chemically to the presence of sterilization product).

The selection of a metal material also makes it possible to limit the wear and tear of the ring 82 although the friction is advantageously limited (by comparison with the state of the art) because of the control of the change in position of the gripping means 50.

By comparison with the elastomer materials that are often used in the prior art, the use of metal material for the gripping means 50 advantageously eliminates any risk of pollution of the inside of the hollow body by elastomer particles.

The gripping means 50 according to the invention make possible a better longevity of use, which is an economic advantage, in particular because of their large number in a transport system equipping, for example, a furnace of a container manufacturing installation.

In addition, the gripping means 50 have a high reliability of operation even under conditions of use at high temperatures, such as those encountered in a furnace for thermal conditioning of preforms 12.

Owing to the control of the change in position of the gripping means 50, the risks of marking the neck 16 that existed previously with the state of the art because of shrinking-on by force are eliminated.

Advantageously, the ring 82 comprises an inner face 102 comprising hollow areas 104 in which the convex portions 94 of the spring 80 are accommodated radially; for this reason, the rotation of the spring 80 is prevented without affecting its radial deformation.

Preferably, the gripping ring 82 is made in three equal sectors that are placed at 120° and that, separated by a slot 106, are respectively independent of one another.

Advantageously, the ring 82 is able to pick up coaxiality faults between the neck 16 of the preform 12 and the gripping means 50 of the device 10.

Each sector of the ring 82 comprises an upper flange 108 and a lower flange 110 that are accommodated with a radial play respectively in a housing 112 formed in the crosspiece 57 and in a housing 114 formed in the lower part 58 of the intermediate part 60.

Advantageously, the flanges 108, 110 form a radial stop for each sector of the ring 82 that determines the maximum travel of movement toward the deployed position.

Preferably, the lower flange 110 comprises a pin 116 that extends vertically downward projecting from the flange 110 to lock in rotation the sector of the ring 82 and/or to guide it radially during the movement between the retracted and deployed positions.

Hereinafter, the operation of the transport device 10 will be described according to the first embodiment, more specifically and with reference to FIGS. 3 to 8: the stages used for carrying out successively the gripping (or so-called "covering" operation) of a hollow body 12 by the inside of its neck 16 and then its release (or so-called "uncovering" operation).

The transport device 10 shown in FIG. 3 is in a position of rest, in the free state, in which the gripping means 50 occupy the retracted position.

The control rod 32 is in the bottom position; the return spring 42 stresses the rod 32 vertically downward by means of the support cup 66 that abuts against the ring 65 that is integral with the rod 32.

The intermediate part 60 is stressed vertically downward by the intermediate return spring 64.

In the absence of the neck 16, the pin 72 that forms the first stop means 70 rests against the lower end of the hole 74, and the balls 78 are not stressed radially toward the outside by the lower part 33 of the rod 32.

In said position of rest, the first stop means 70 are located between the intermediate part 60 and the rod 32 against the intermediate return element 64, and they determine the vertical position of the intermediate part 60 relative to the control rod 32.

In this position of rest of the transport device 10, there exists, vertically, play between the shoulder 37 of the control rod 32 and the stop face 59 that together form the second stop means 76 between the rod 32 and the intermediate part 60.

The spring 80 radially stresses the balls 78 toward the inside; the gripping means 50 occupy their retracted position for which the outer diameter of the ring 82 is less than the inner diameter of the neck 16 of the preform 12.

In this position of rest, the gripping means 50 project outside of the inner housing 52 of the ejector 46 and extend vertically beyond the support surface 48.

FIG. 4 shows the transport device 10 in a first operating position that is obtained from the position of rest after a first stage.

During the first stage, the actuating means 40 shown diagrammatically by an arrow are controlled for acting on the hub 38 of the driving part 34 so as to pull on the rod 32 to move it vertically upward.

The vertical movement of the rod 32 up to the top position is carried out against the return spring 64 of the rod 32; the spring 64 is then compressed by means of the cup 66, which, abutting the ring 65, is integral upon movement of the rod 32.

The traction force exerted on the driving part 34 of the rod 32 by the actuating means 40 is greater than the return force exerted by the return spring 42 on the rod 32. The rod 32 is held in the top position, even though the traction force applied by the actuating means 40 remains higher; otherwise, the rod 32 is automatically returned vertically downward by the return spring 42.

The first stage has as its consequence retracting the gripping means 50 vertically upward, inside the inner housing 52 of the ejector 46; for this reason, the neck 16 of the preform 12 that forms said hollow body is able to be installed without interference with the gripping means 50.

Most particularly, the retraction of the gripping means 50 allows the radial insertion of the preform 12 to bring its neck 16 into the specified reference position for which said neck 16 is aligned vertically with said gripping means 50, perpendicular for the purpose of its gripping by the latter.

The neck 16 is housed in the free space by the retraction of the gripping means 50, close to said gripping means 50 like the ejector 46.

In the specified reference position, the preform 12 is held in position at least until the gripping by the gripping means 50 of the transport device 10 is effective.

Preferably, the preform 12 is supported by means of its radial collar 26 that rests on support means (not shown), for example, the periphery of one of the slots of a transfer wheel supplying in preforms the furnace of a container manufacturing installation.

The gripping means 50 carried by the intermediate part 60 are movably connected to the rod 32, with the pin 72 engaging with the hole 74 to form the first stop means 70; the movable apparatus formed by the rod 32 and the intermediate part 60 slides vertically upward, entrained by the actuating means 40.

The first stop means 70 become involved in movably connecting the intermediate part 60 to the control rod 32 when the rod 32 is moved vertically upward.

During the vertical movement of the rod 32 toward its top position, the gripping means 50 remain in the retracted position.

Actually, with the intermediate return spring 64 stressing the intermediate part 60 vertically downward, the balls 78 are not stressed by the rod 32 that is offset vertically and are returned radially toward the inside by the spring 80.

In a second stage that is illustrated in FIGS. 5 and 6, with the neck 16 of the preform 12 occupying said specified reference position, the transport device 10 is controlled for making possible the gripping of the preform 12 by the inside of the neck.

The gripping is achieved by moving the rod 32 vertically downward in the direction of the neck 16 to insert therein the gripping means 50 by controlling their change in position from the retracted position toward the deployed position.

Owing to the return spring 42 of the rod 32, the lowering of the rod 32 from the top position toward the bottom position is achieved automatically by ceasing to exert the traction force on the rod 32; the actuating means 40 are controlled for this purpose in a synchronous manner.

During the vertical lowering of the rod 32 toward the bottom position, the control stop 92 formed by the shoulder of the intermediate part 60 abuts against the edge 20 of the neck 16 then immobilizing the intermediate part 60 while the rod 32 continues its downward vertical movement.

The control stop 92 is able to engage with the edge 20 of the neck 16 to bring about an upward relative movement of the intermediate part 60 relative to the control rod 32, against the intermediate return element 64.

More specifically, the control rod 32 is able to continue its lowering relative to the intermediate part 60 within the limits of the vertical travel that is determined by the second stop means 76.

The vertical travel between the rod 32 and the intermediate part 60 that is determined by the stop means 76 corresponds to the course of the rod 32 for controlling the change in position of the gripping means 50.

FIG. 5 shows the transport device 10 at the time when the control stop 92 enters into contact with the edge 20 of the neck 16 of the preform 12.

The pin 72 is always in the same position as that occupied in FIG. 4, and a vertical play exists between the shoulder 37 and the stop face 59.

When the control stop 92 rests against the edge 20, the gripping means 50 are then introduced vertically inside the neck 16 in the retracted position and correctly placed to ensure the gripping thereof.

With the outer diameter of the gripping ring 82 in the retracted position being less than the inner diameter of the neck 16, the insertion is done without contact with the inner wall 24 of the neck 16.

Advantageously, the control stop 92 that is made on the edge 20 makes it possible to select a reference on the neck 16 and ensures the good positioning, both vertical and radial, of the gripping means 50 inside the neck 16.

In FIG. 5, there is radial play between the outer face 100 of the sectors of the ring 82 and the inner wall 24 of the neck 16 opposite.

Once the intermediate part 60 abuts the neck 16, the rod 32 then continues by itself its downward vertical movement to control the change in position of the gripping means 50 by reaching the bottom position shown in FIG. 6.

The relative movement of the control rod 32 relative to the intermediate part 60 is carried out against the intermediate return spring 64 of the part 60.

Actually, with the intermediate part 60 being immobilized vertically by the neck 16, the cup 66 then compresses the intermediate return spring 64 of the part 60.

By continuing its vertical travel downward, the truncated cone-shaped control surface 88 of the control rod 32 will stress the balls 78 of the gripping means 50 against the spring 80 and will bring about the movement of said balls 78 radially toward the outside.

The balls 78 rest on the ring 98 that transmits the force to the spring 80 by means of the concave portions 96, which spring 80 then radially stresses toward the outside the sectors of the ring 82 for bringing the outer surface 100 into contact with the inner wall 24 of the neck 16.

The gripping means 50 then occupy the deployed position in which the sectors of the ring 82 apply on the inner wall 24 a radial force that is able to ensure its gripping by the transport device 10.

Advantageously, the gripping force applied by the three sectors of the ring 82 via their outer surface 100 is generally circumferentially continuous on the periphery of the inner wall 24 of the neck 16.

Since the intermediate return spring 64 was compressed during the end of the lowering of the rod 32, this spring 64 then stresses the intermediate part 60 vertically downward.

This is one of the reasons for which locking means 90 are advantageously provided for locking said gripping means 50 in the deployed position.

Preferably, the balls 78 are accommodated in the annular groove 90 made in the segment 33C of the lower part 33 of the rod 32 in such a way as to lock the gripping means 50 in the deployed position.

By comparison between FIGS. 5 and 6, during the end of the lowering of the rod 32, the pin 72 leaves its stop position to move vertically upward into the hole 74, in the direction of the other edge. The pin 72 does not, however, enter into contact here with the other edge since the second stop means 76 are preferably produced elsewhere.

Thus, the vertical play that is present in FIG. 5 between the shoulder 37 and the stop face 59 no longer exists in FIG. 6; the shoulder 37 abuts against the face 59, and they advantageously form the second stop means 76 that determine the position of the control rod 32 relative to the intermediate part 60.

For the release of the preform 12 corresponding to a third stage, the actuating means 40 are again controlled for acting on the driving part 34 that is integral with the rod 32 so as to move the rod 32 vertically upward, from the bottom position of FIG. 6 toward the top position.

The traction force exerted by the actuating means 40 brings about—relative to the body 30—the upward movement of the rod 32 and entrains that of the intermediate part 60 and the preform 12 since, with the gripping means 50 being in the deployed position, the preform 12 is held by the inside of its neck 16.

The unit moves vertically upward until the edge 20 of the neck 16 comes to rest against the support surface 48 of the ejector 46 and vertically immobilizes the preform 12.

Advantageously, the control stop 92 of the crosspiece 57 only extends radially over an inner portion of the edge 20 of the neck 16, leaving the outer portion free to abut against the support face 48.

However, because of the engagement of the gripping means 50 with the inner wall 24 of the neck 16, the intermediate part 60 is also immobilized, which brings about a relative movement between the intermediate part 60 and the rod 32 that continues its rise, entrained by the actuating means 40.

The movement of the rod 32 relative to the ejector 46 that is integral with the body 30 continues vertically toward the top position, and the force from the opposite direction applied by the support face 48 on the edge 20 brings about the unlocking of the balls 78 that exit from the annular groove 90 of the rod 32.

The gripping means 50 in the deployed position and the neck 16 then form an integral whole that is immobilized vertically by the support abutting the edge 20 against the support face 48 of the ejector 46.

With the intermediate return spring 64 stressing the intermediate part 60 vertically downward, the pin 72 moves again into the hole 74 to come into an abutting position; the intermediate part 60 is then integral upon vertical movement of the control rod 32.

Advantageously, the intermediate return spring 64 exerts—by means of the intermediate part 60—a thrust force on the edge 20 of the neck 16, more specifically by means of the upper part 56 and the crosspiece 57 comprising the shoulder 92 that engages with the edge 20.

The thrust force applied by the spring 64 is oriented vertically downward; said force consequently helps to release the neck 16 from the preform 12.

As can be seen in FIGS. 7 and 8, there is again vertical play between the shoulder 37 and the face 59 that form the second stop means 76.

The balls 78 of the gripping means 50 are no longer stressed radially toward the outside by the control rod 32 that is moved vertically upward relative to the intermediate part 60, and the gripping ring 82 always engages by the inner wall 24 of the neck 16 in such a way that the gripping means 50 can only move radially toward the inside.

The spring 80 that is compressed until then in the deployed position then stresses the balls 78 radially toward the inside by means of the ring 98; the gripping means 50 are thus returned automatically from the deployed position toward the retracted position.

The return of the gripping means 50 toward the retracted position then automatically brings about the release of the neck 16 from the preform 12.

In the refracted position, the outer diameter of the ring 82 is less than the inner diameter of the passage opening that is delimited circumferentially by the edge of the ejector 46 comprising the support face 48. The gripping means 50 are able to be retracted again vertically upward into the housing 52 of the ejector 46.

According to the desired vertical orientation of the preform 12, the transport device 10 can equally both hold the hollow body suspended by its neck (so-called "neck up" position) as well as support it (so-called "neck down" position).

Advantageously, if the preform 12 is oriented vertically with the neck 16 above the body 14 (so-called "neck up" position), gravity facilitates the separation of the preform 12.

Figure 7:
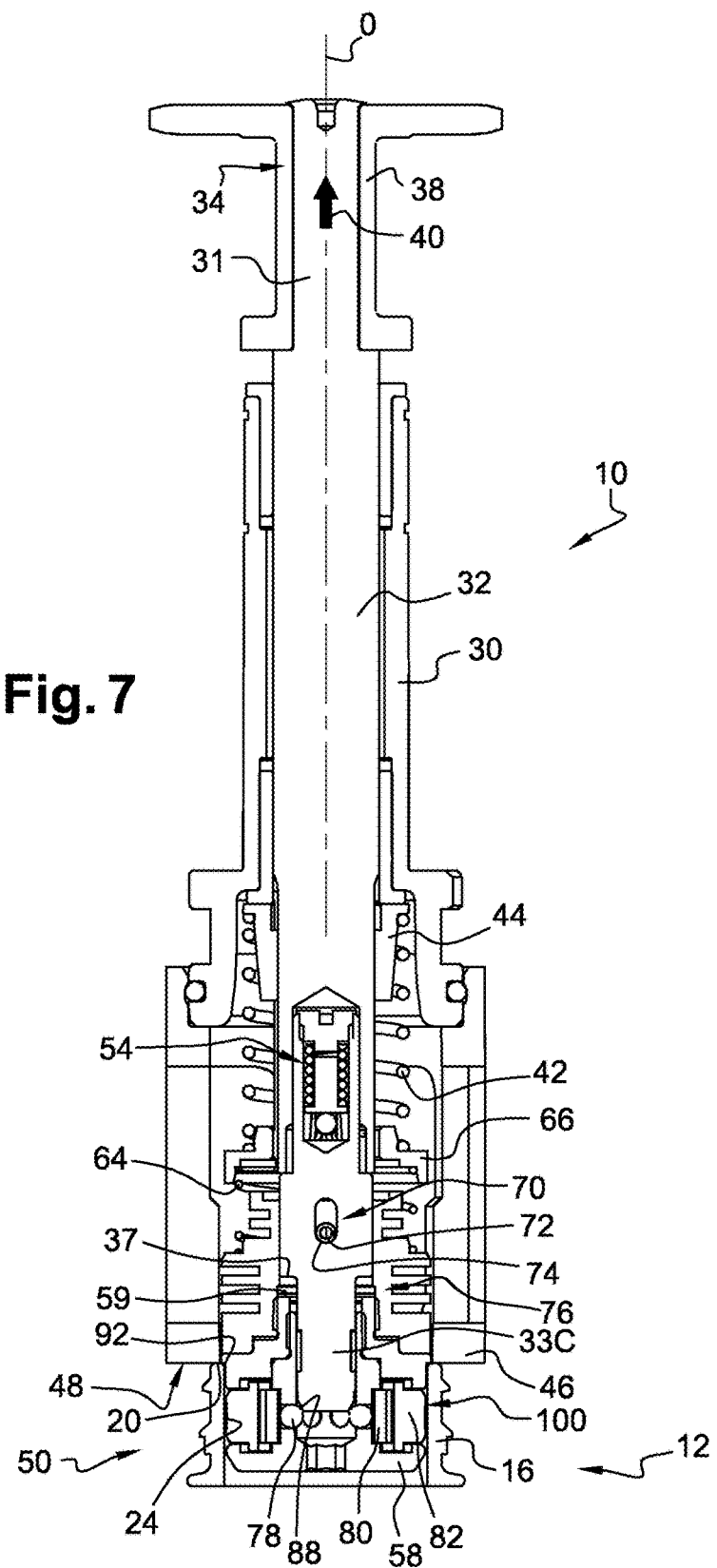
Figure 8:
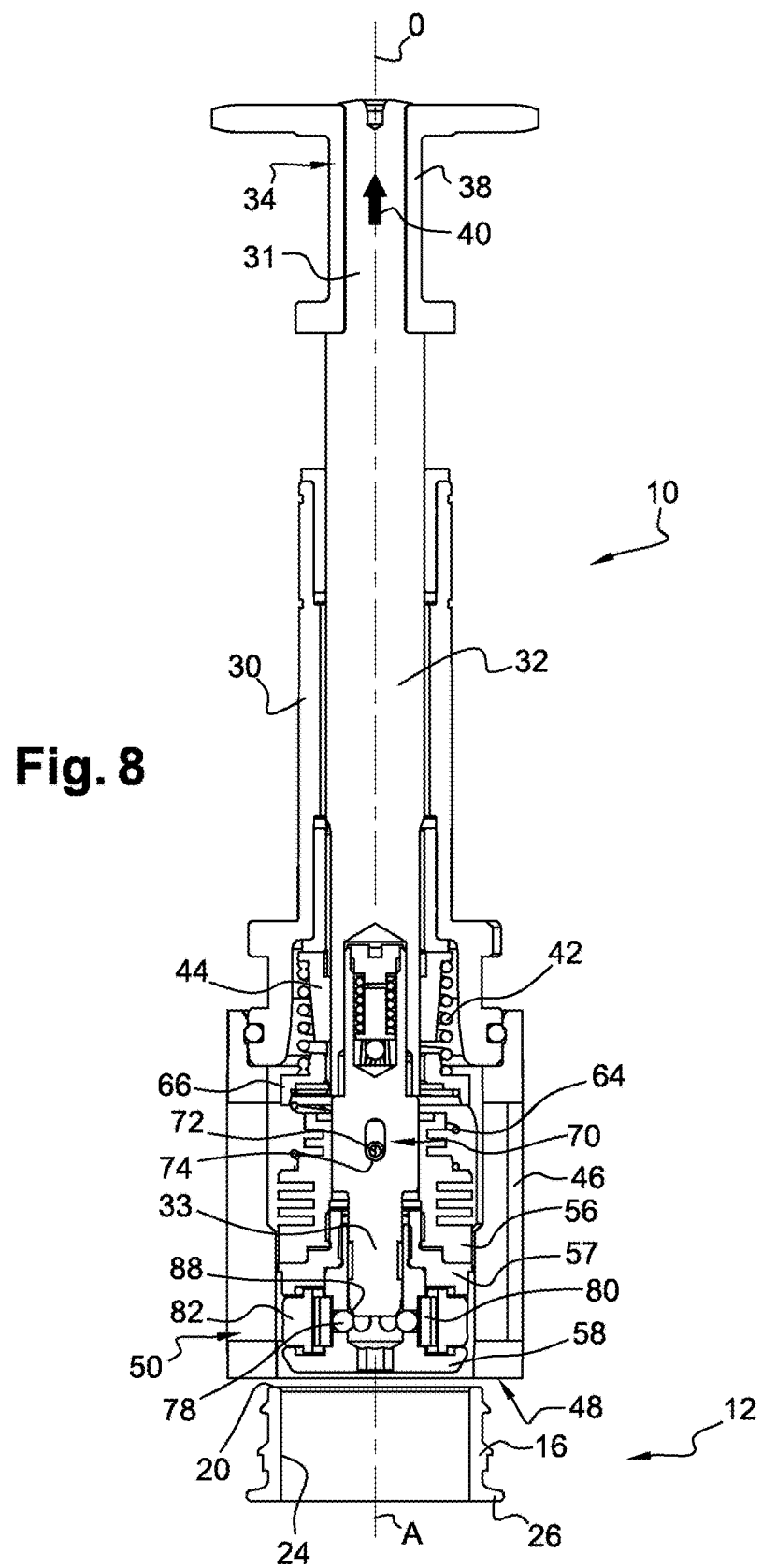

As shown in FIG. 8, the control rod 32 then occupies its top position, and the transport device 10 is able to implement the gripping by the inside of the neck 16 of a new preform 12 in a manner that is identical to that which was just described with reference to FIGS. 3 to 8.

Advantageously, the gripping (or "covering") of a preform 12 is consequently achieved in a simple manner in two successive stages: a first stage, so-called arming, of the device 10, and then a second stage, so-called release, of the controlled gripping means 50 in the direction of the neck 16.

Advantageously, the control of the actuating means 40 of the rod 32 is synchronized with the radial insertion of the hollow body into the specified reference position relative to the transport device 10, with the insertion being performed between the first and second stages.

The release (or "uncovering") is achieved simply owing to the automatic return of the gripping means 50 toward the retracted position.

In addition, the ejector 46 could advantageously be eliminated to simplify the transport device 10, in particular owing to the assist force applied by the intermediate return spring 64 on the neck 16 by means of the shoulder that forms the control stop 92 and, if necessary, forces of gravity.

Advantageously, such a device 10 is particularly fast because of the fact that the gripping of the hollow body by its neck is achieved simultaneously with the insertion, by the lowering of the rod 32, of the gripping means 50 inside the neck 16 and the control of their change in position.

Such advantages are particularly advantageous in the case of an implementation for the transport of preforms within a furnace of a container manufacturing installation.

Actually, the preforms 12 are in general brought to the inlet of the furnace by a transfer wheel with slots that is driven in rotation in a direction that is opposite to that of the transport system comprising transport devices 10 arranged one after the other.

The gripping of the preform 12 is then to be implemented in a lapse of time that is all the shorter as the speed of the transport system, determined by the manufacturing production rates, is higher.

Each preform 12, supported by its radial collar 26 and brought in by the transfer wheel, passes through an angular sector until reaching a "tangency point" in which the neck 16 of the preform 12 occupies said specified reference position relative to the gripping means 50 of the transport device 10.

The gripping of the neck 16 is consequently to be carried out in a synchronous manner at the precise moment when the preform 12 occupies said position for which its axis A is merged with the main axis O of the transport device 10.

Advantageously, and by comparison with the state of the art, the control by the rod 32 of the change in position of the gripping means 50 makes it possible to limit both the gripping and the release of the forces applied radially on the neck 16.

During the gripping, there is actually no contact with the inner wall 24 when the gripping means 50 occupy the retracted position in which their outer diameter is less than the inner diameter of the neck 16.

Likewise, during the release, with the gripping means 50 being returned automatically to the retracted position, the force applied to the edge 20 of the neck 16 by the control stop 92 is a release assist force.

By comparison, such an assist force is much smaller than the force applied previously in the state of the art for extracting from the neck the gripping means that had previously been shrunken-on there by force.

Such advantages of the transport device 10 according to the invention are all the more decisive in that the continuous search for reducing the manufacturing cost of the containers, in which thermoplastic material (PET, etc.) holds a prominent place, leads to having preforms whose light necks are increasingly fine and therefore fragile.

A variant embodiment of the first embodiment was shown in FIGS. 11 to 16.

FIGS. 11 to 14 illustrate successive positions of the transport device 10 during stages for implementing the gripping and then the release of a hollow body 12 that is equipped with a neck 16, such as a preform or a container shown in FIG. 1.

Figure 9:
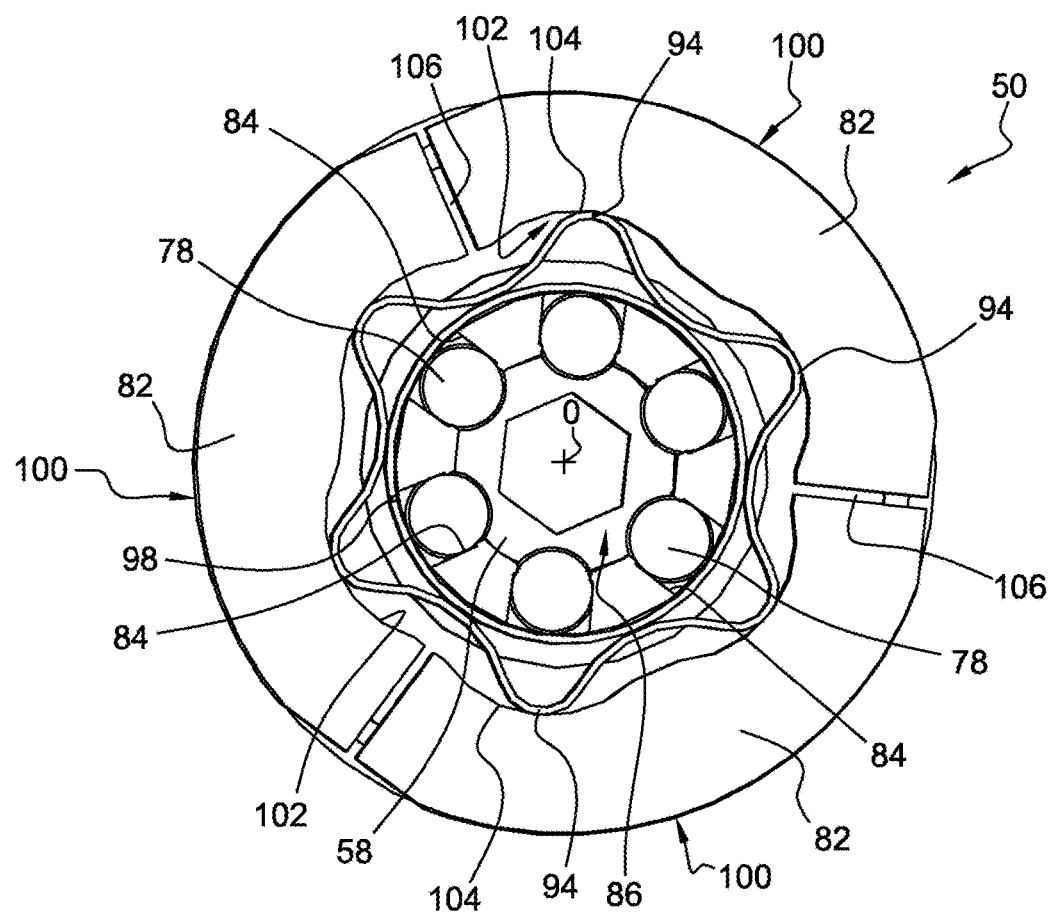
FIGS. 9 and 10 are respectively a radial cutaway view and an exploded view that show in detail the gripping means according to the first embodiment.
Figure 15:
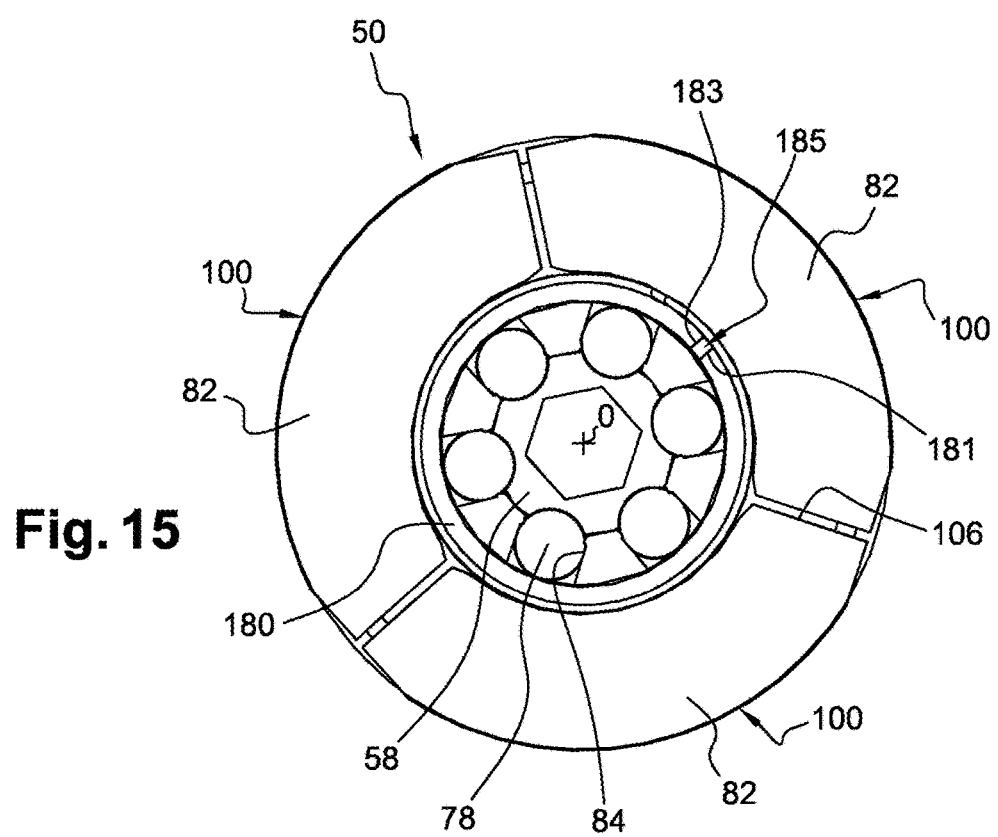
FIGS. 15 and 16 are respectively a radial cutaway view and an exploded view that show in detail the variant embodiment of the gripping means of the first embodiment according to which the gripping means comprise an elastic ring.
Figure 16:
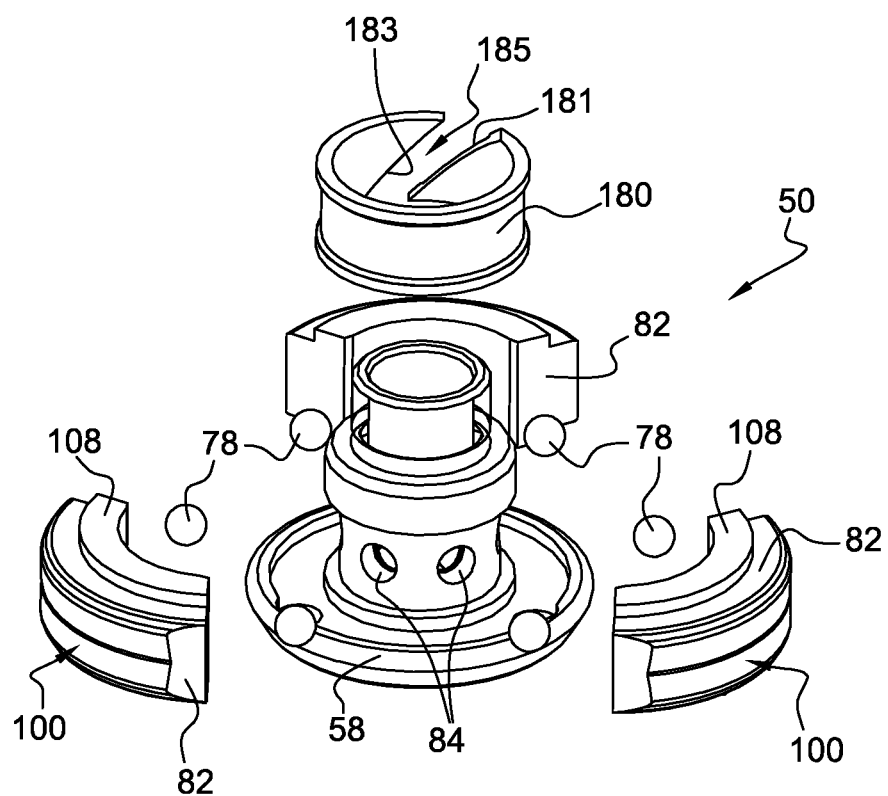

FIGS. 15 and 16 are views that, analogous to FIGS. 9 and 10 of the first embodiment, illustrate in detail the variant embodiment of the radially deformable elastic means that the gripping means 50 comprise.

The following description of the variant will be provided by comparison with the first embodiment shown in FIGS. 2 to 10; the same reference numbers in FIGS. 11 to 16 refer to means that are similar, analogous, or identical to those described above.

According to this variant embodiment, the ring 98 and the wavy spring 80 of the first method are replaced by a ring 180 that, advantageously made of plastic material, is elastically deformable in the radial direction.

As shown in FIGS. 15 and 16, the ring 180 is open to make possible the deformation by operation thereof.

The ring 180 respectively comprises a first edge 181 and a second edge 183 that form the free ends thereof.

Preferably, the edges 181, 183 do not extend vertically in a rectilinear manner and define between them an oblique slot 185.

Figure 11:
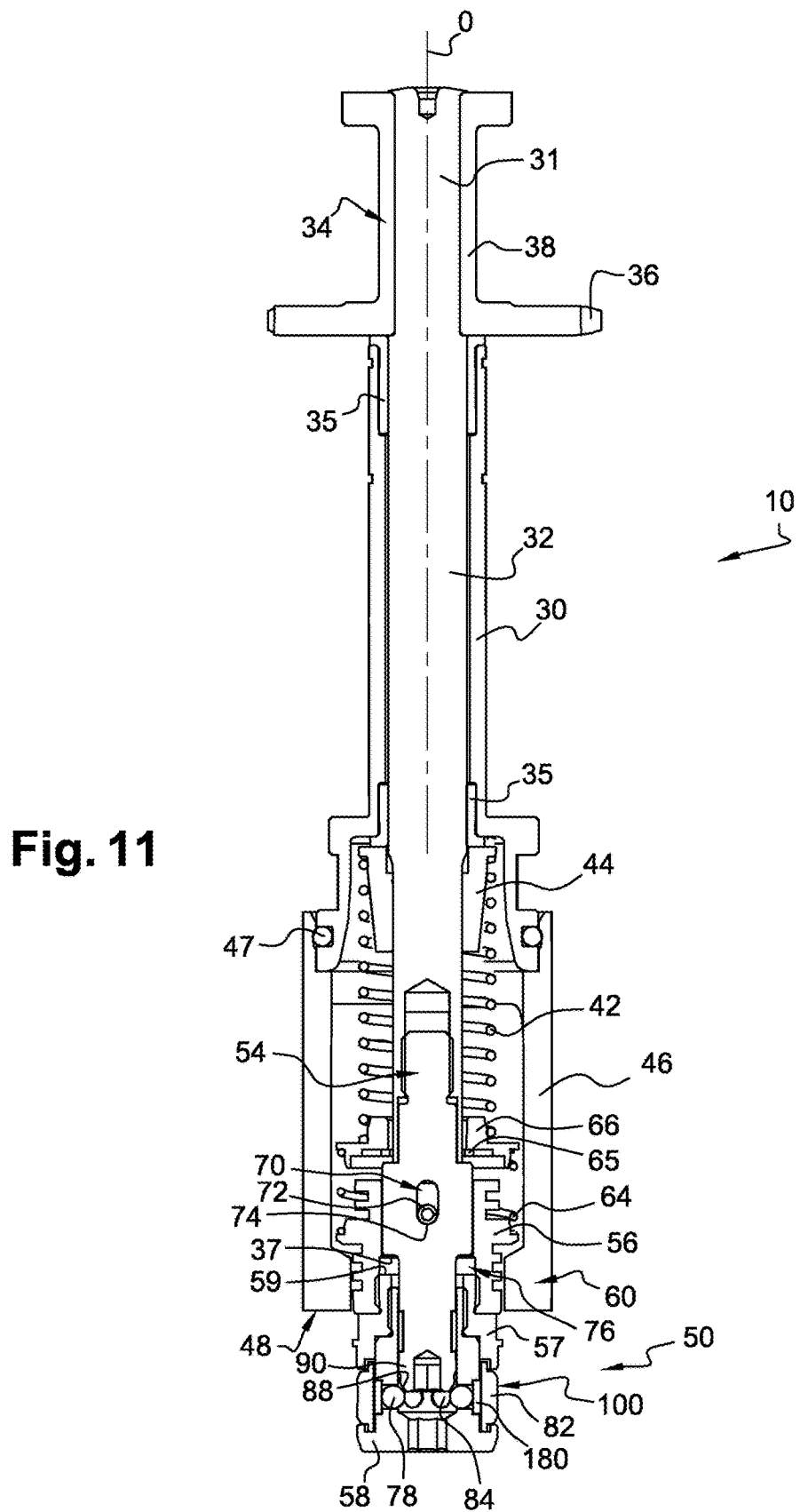
FIGS. 11 to 14 are cutaway views that show a transport device that, similar to the one of the first embodiment, comprises a variant embodiment of the gripping means and that illustrate the operating positions that are successively occupied for implementing the gripping and then the release of a hollow body that is equipped with a neck such as a preform or a container according to FIG. 1.

FIG. 11 shows the transport device 10 in a position of rest, or in the free state.

The driving part 34 of the control rod 32 differs from that of the first embodiment in that the radial portion of the part 34 comprising the pinion 36 extends vertically below the hub 38.

The connecting means 54 are of the screw type, with the lower detachable part 33 of the rod comprising a threaded free end that is screwed inside a mating threaded hole made in the lower end of the upper part of the control rod 32 mounted in the body 30 of the transport device 10.

Figure 12:
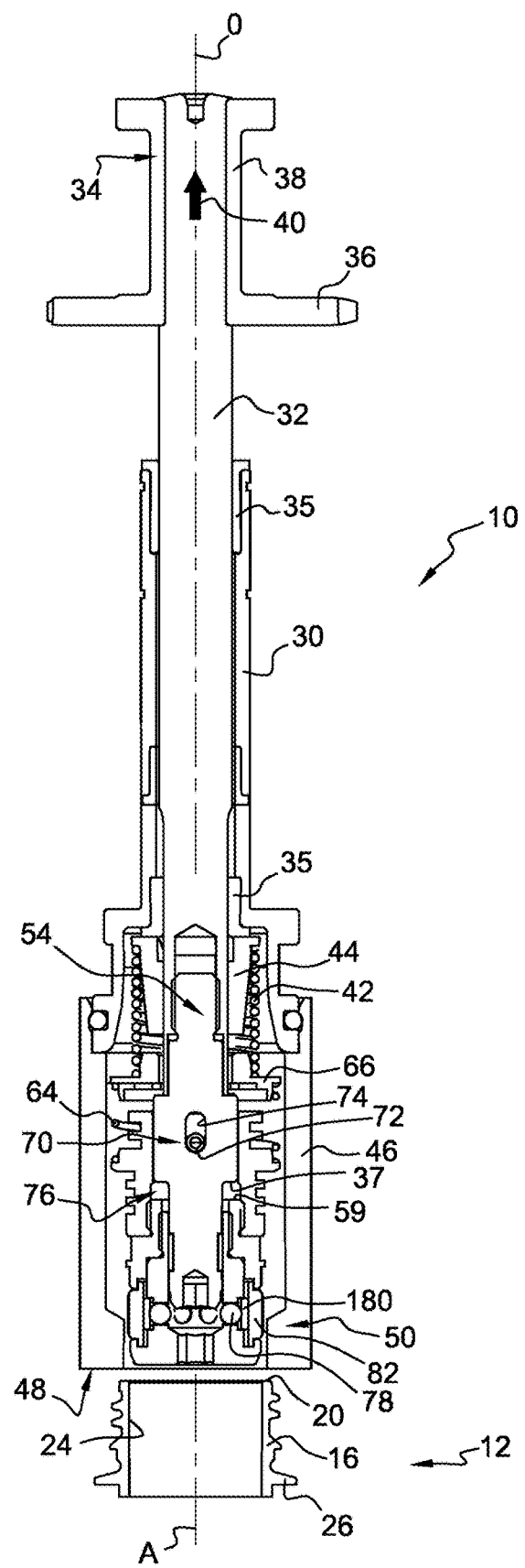

FIG. 12 shows the first stage during which the control rod 32 is moved vertically toward its top position by the actuating means 40.

The gripping means 50 are carried by the intermediate part 60 that is offset vertically downward relative to the rod 32 of the travel provided by the first stop means 70, with the intermediate part 60 being stressed downward by its intermediate return spring 64.

The gripping means 50 are refracted vertically upward into the housing 52 delimited by the ejector 46, owing to which the preform 12 can be inserted radially into the specified reference position relative to the gripping means 50.

The gripping means 50 occupy the retracted position; the balls 78 are stressed radially toward the inside in their housing 84 by the ring 180.

Figure 13:
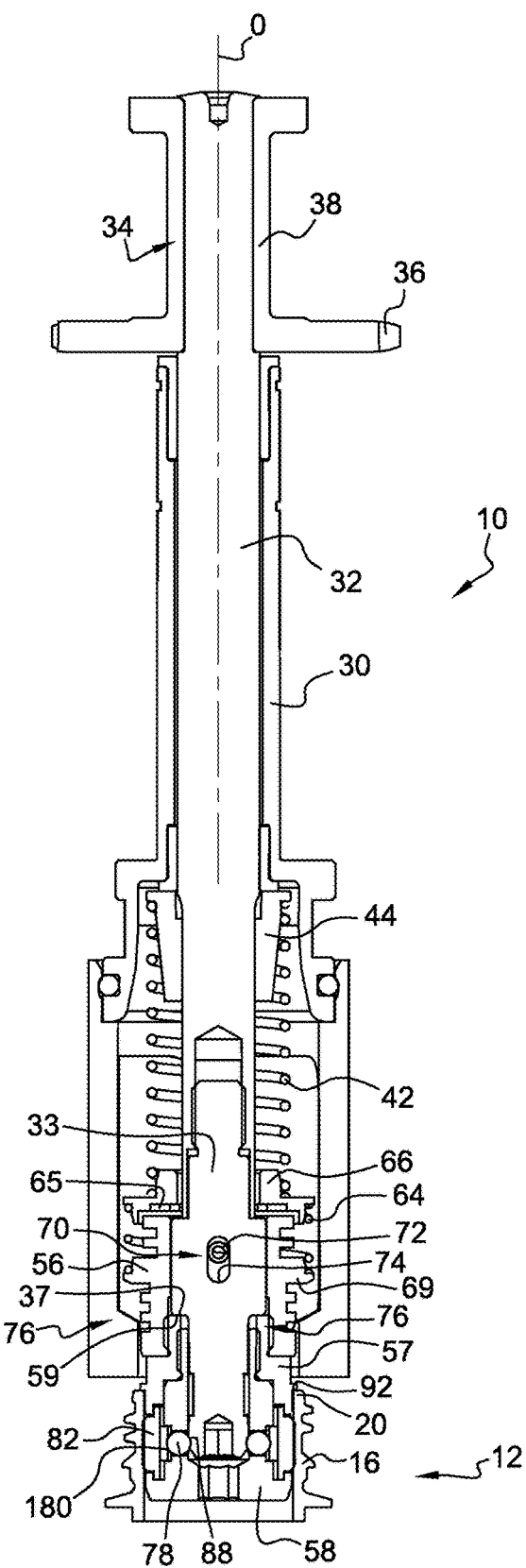

FIG. 13 corresponds to FIG. 6 of the first embodiment described above and illustrates the gripping of the neck 16 by the gripping means 50 of the transport device 10.

With the actuating means 40 ceasing to exert the traction force on the rod 32, the rod 32 is returned vertically downward by the return spring 42.

The lowering of the rod 32 has the effect of inserting the gripping means 50 inside the neck 16; the intermediate part 60 is then immobilized by the control stop 92 against the edge 20 of the neck 16, and the rod 32 continues to drop until the change in position of the gripping means 50 from the retracted position toward the deployed position is controlled.

The rod 32 comprises a truncated, cone-shaped control surface 88 that is designed to engage with the balls 78, with the vertical movement toward the bottom of the rod 32 bringing about the movement of the balls 78 radially toward the outside against the elastic ring 180, thus controlling the change in position toward the deployed position.

The balls 78 stressed by the rod 32 radially compress the ring 180 in such a way that the ring 180 radially stresses toward the outside the sectors of the ring 82 whose respective outer surfaces 100 will then engage with the inner wall 24 of the neck 16 of the preform 12.

The rod 32 reaches its bottom position when the second stop means 76 become involved, and the balls 78 are then advantageously accommodated in a groove 90 of the rod 32 to ensure a locking of the deployed position.

Actually, the lowering of the rod 32 after the abutting of the control stop 92 brings about the compression of the return spring 64 by means of the support cup 66.

The locking means 90 consequently make it possible to prevent a release of the gripping means 50 under the action of the force applied by said intermediate return spring 64 on the shoulder 69 of the intermediate part 60.

Figure 14:
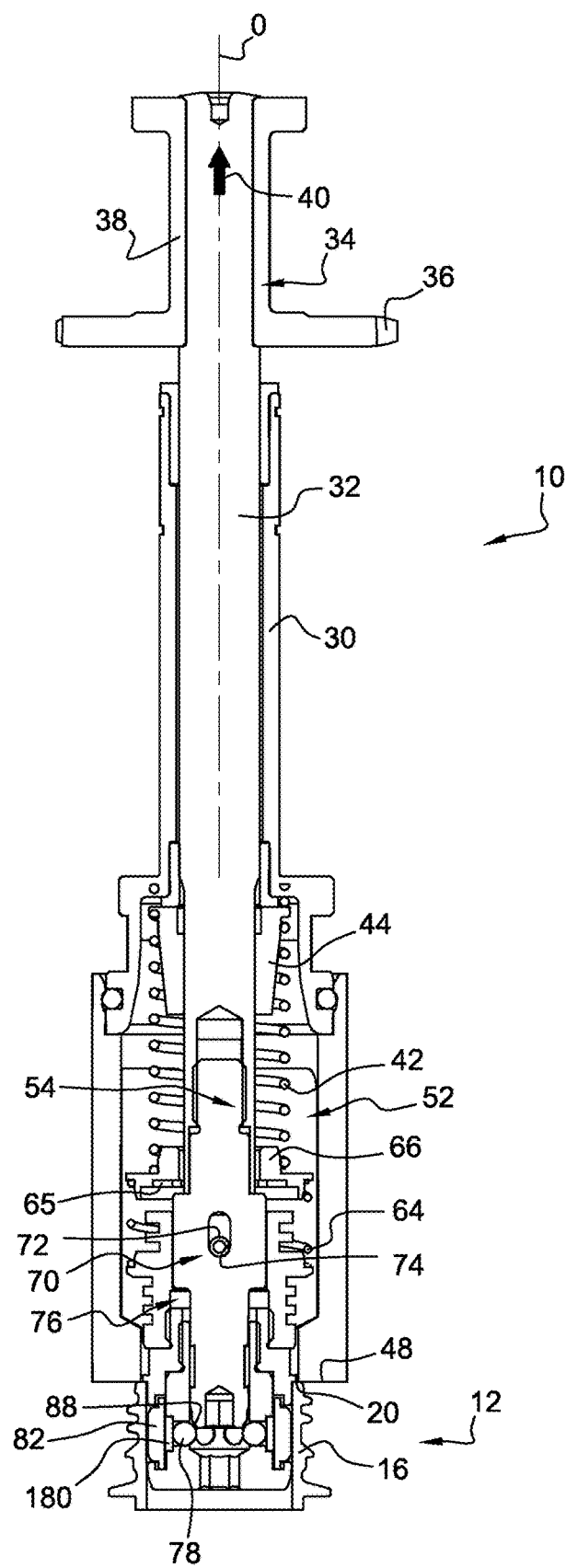

FIG. 14 corresponds to FIG. 7 described above and illustrates the release of the neck 16 of the preform 12 by the gripping means 50.

The actuating means 40 are controlled for moving upward the rod 32 that slides in the body 30 of the transport device 10.

The neck 16 of the preform 12 then also moves until the edge 20 abuts against the support face 48 of the ejector 46; the preform 12 is then immobilized.

The upward movement of the rod 32 that continues is accompanied by a relative movement of the intermediate part 60 within the limits of the travel determined by the first stop means 70, with the pin 72 abutting against the lower edge of the hole 74 as illustrated in FIG. 14.

Actually, the return spring 64 always stresses downward the intermediate part with an assist force that facilitates the unlocking of the balls 78 and the return of the balls 78 by the ring 180 radially toward the inside, toward the refracted position of the gripping means 50; for this reason, the release of the neck 16 from the preform 12 is achieved.

A second embodiment of a device 10 for transport of a hollow body equipped with a neck is shown in FIGS. 17 to 22.

The description of this second embodiment will advantageously be given by comparison with the first embodiment shown in particular in FIGS. 2 to 10 and described above.

In this second embodiment, the gripping means 50 are identical to those of the first embodiment, and the general operation of the transport device 10 for implementing the gripping of a hollow body by the inside of the neck and then its release is analogous, in particular said first and second stages.

By comparison with the first embodiment, the second embodiment is characterized by the absence of an ejector 46.

In the first embodiment (as in the variant), the ejector 46 and its support face 48 have a function that is different than they had previously in the state of the art.

In the state of the art, the abutting of the edge of the neck that is produced against the support face of the ejector has as its function to make possible the change in state of the gripping means by applying, in reaction, a force on the neck that is in a direction opposite to the traction force exerted by the rod carrying the gripping means and moved vertically upward.

According to the invention, with the change in position of the gripping means 50 being advantageously controlled by the vertical movement of the rod 32, the abutting of the edge 20 of the neck 16 that is produced against the support face 48 of the ejector 46 has as its function to bring about the unlocking of the deployed position in which the gripping means 50 are held, thanks to the engagement between the balls 78 and the groove 90 made at the end of the lower part 33 of the rod 32.

In this second embodiment, the unlocking function for the purpose of the release of the neck 16 from the preform 12 is carried out as described below.

Figure 17:
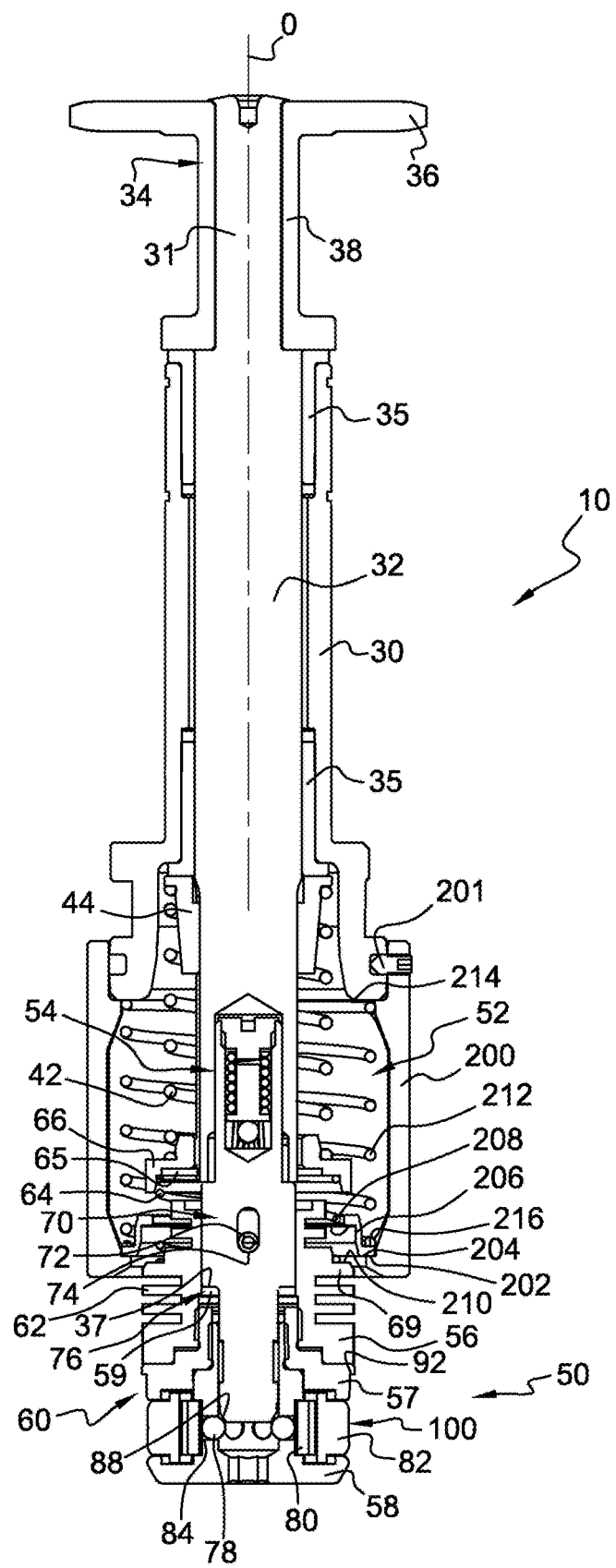

FIG. 17 shows the transport device 10 in a position of rest, in the free state.

The device 10 comprises a support 200 that surrounding the rod 32 delimits an inner housing 52 and is mounted integrally on the body 30 of the transport device 10.

Preferably, the support 200 can be detached, and its upper end is securely connected, for example, by means of screws 201 onto the lower end of the body 30.

The support 200 comprises a radially-oriented upper face 202 that is designed to engage selectively with a first lower face 204 that is carried by a stop 206 that is vertically movable.

The movable stop 206 is formed by, for example, a staged part that is hollowed out through the center to make it possible for the rod 32, the cup 66, and return springs 42 and 64 to pass through on the inside vertically.

Overall, the movable stop 206 has a "Z" shape and comprises an upper part that extends radially toward the inside and a lower part that extends radially toward the outside, with said upper and lower parts being connected to one another by an intermediate part, here advantageously of vertical orientation.

The first lower face 204 is carried by the lower part of the stop 206, and for its part, the upper part of the stop 206 carries a second lower face 208.

The second lower face 208 is designed to engage selectively with an upper face 210 that is carried by the shoulder 69 against which the lower end of the intermediate return spring 64 stresses the intermediate part 60 vertically toward the bottom.

More specifically, the shoulder 69 is integral with the upper part 58 of the intermediate part 60, where the upper part 56 comprises cooling fins 62.

The first and second lower faces 204, 208 of the movable stop 206 are designed to engage respectively with the face 202 of the support and the face 210 of the intermediate part 60.

The stop 206 is mounted to move against a return spring 212 that stresses the stop 206 vertically downward.

The upper end of the return spring 212 of the stop 206 downward rests on a face 214 carried by the body 30 of the transport device 10, and the lower end of the spring 212 rests on the stop 206.

The lower end of the return spring 212 rests on an upper face 216 carried by the lower part radially outside the stop 206 and that is opposite vertically from the first lower face 204.

As shown in FIG. 17, with the transport device 10 being in a position of rest, the stop 206 is stressed vertically downward by the lower end of the return spring 212 whose upper end rests against the face 214 of the body 30.

The movable stop 206 abuts downward against the support 200 and is then immobilized vertically upward by the force applied by the spring 212.

The first lower face 204 of the stop 206 rests against the upper face 202 of the support 200.

The second lower face 208 of the stop 206 does not rest against the upper face 210 that is carried by the shoulder 69 of the intermediate part 60, and there is vertical play between said faces 208 and 210.

Figure 18:
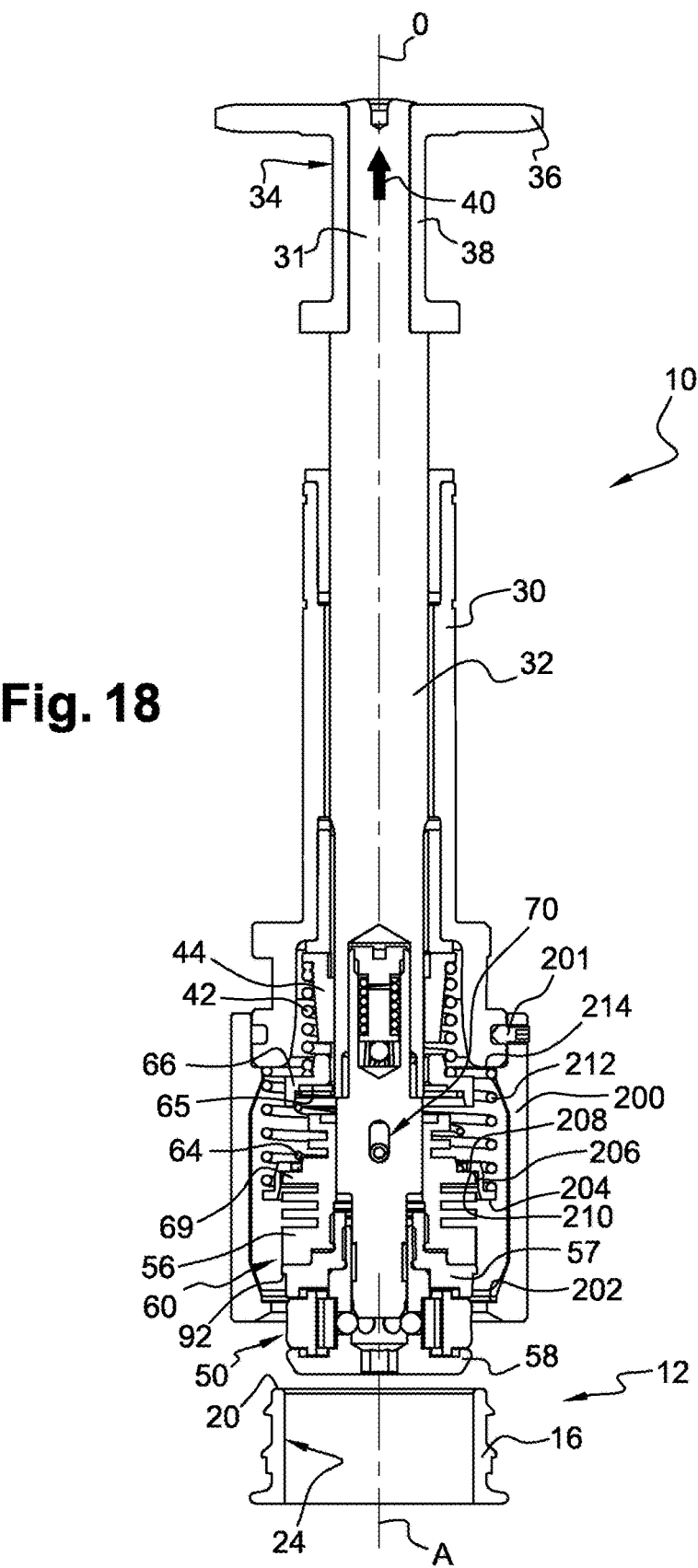

FIG. 18 shows the transport device 10 in a first operating position that is obtained from the position of rest of FIG. 17 after a first stage.

During the first stage, the actuating means 40 shown diagrammatically by an arrow are controlled to act on the hub 38 of the driving part 34 so as to pull on the rod 32 to move it vertically upward.

As described above with reference to FIG. 6 for the first embodiment, the first stage has the effect of vertically retracting gripping means 50 upward, which frees the space for the radial insertion of the preform 12 so as to bring it into said specified reference position in which its neck 16 is aligned vertically with the gripping means 50.

During the upward vertical movement of the rod 32, involving the first stop means 70, the rod 32 and the intermediate part 60 that carry the gripping means 50 are moved vertically upward together.

The intermediate part 60 then also entrains the movable stop 206 vertically upward; the first lower face 204 of the stop 206 stops engaging with the upper face 202 of the support 200.

The upper face 210 carried by the shoulder 69 of the intermediate part 60 comes into contact with the second lower face 208 of the stop 206 in such a way that the vertical play that previously existed between them is canceled.

The stop 206 is moved vertically upward by the intermediate part 60, against the return spring 212 that is compressed.

Figure 19:
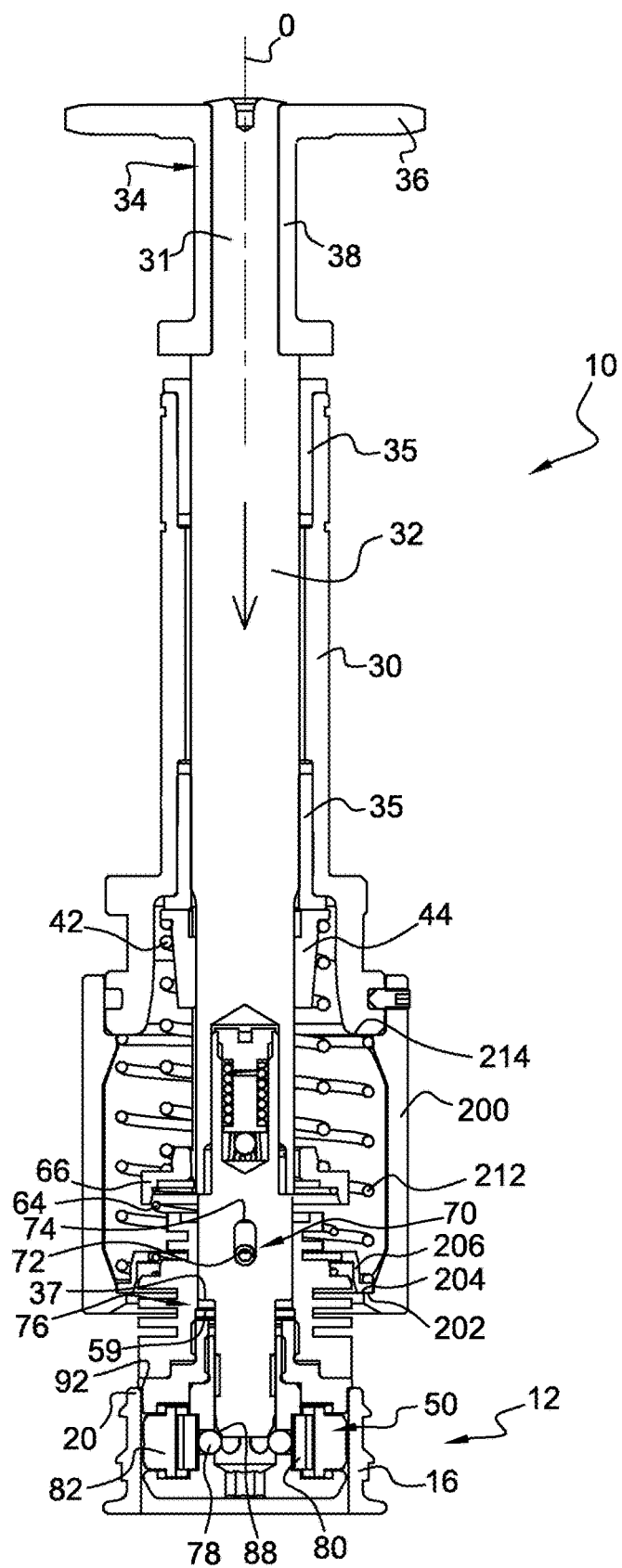

During the second stage that is shown in FIG. 19, the lowering of the rod 32 is performed under the action of the return force of the return spring 42 of the rod 32.

The intermediate part 60 stops against the edge 20 of the neck 16 by means of the control stop 92 carried by its crosspiece 57; the gripping means 50 are then introduced vertically inside the neck 16 and in the retracted position.

The movable stop 206 is returned into its preceding position, namely resting against the support 200, with its first lower face 204 engaging with the upper face 202 of the support 200.

Figure 20:
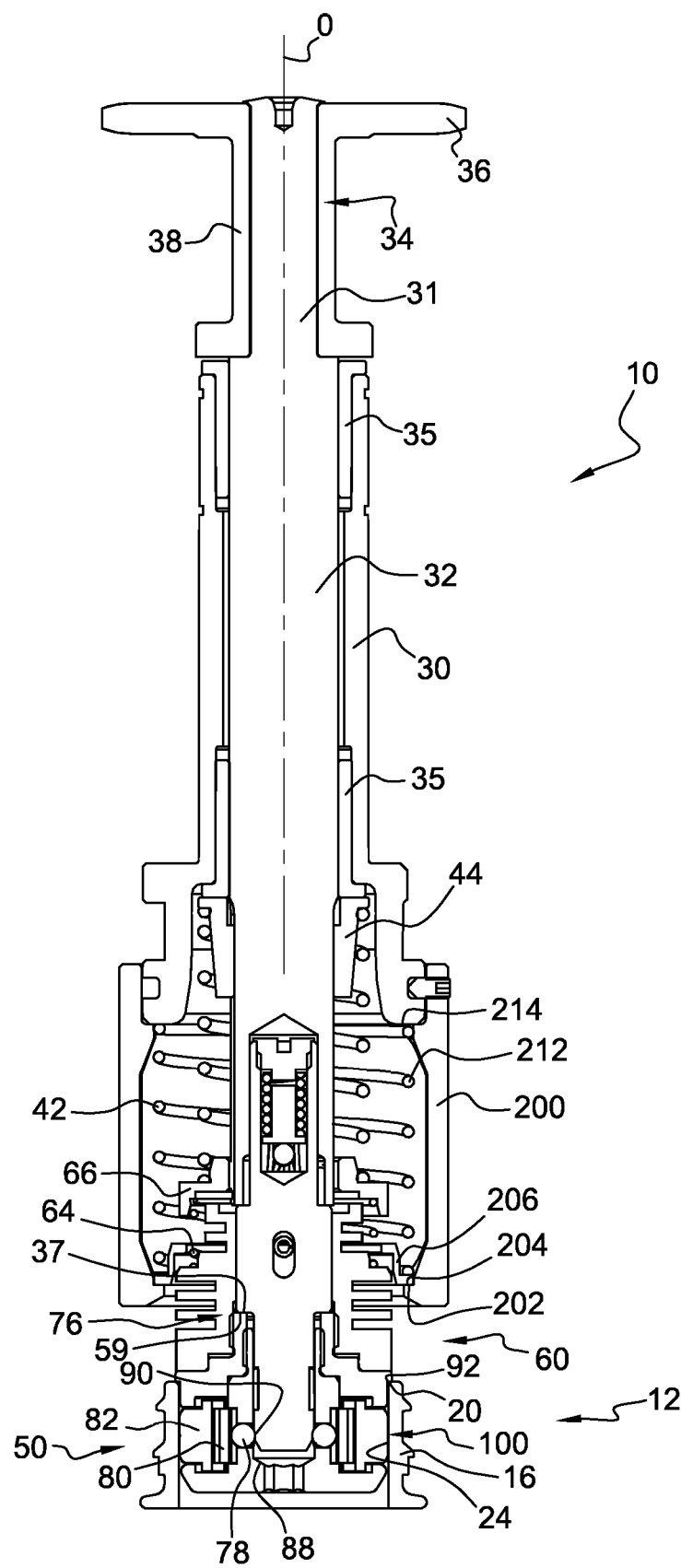

In FIG. 19, the control rod 32 has not yet reached its low position shown in FIG. 20; there is vertical play at the level of the second stop means 76 located between the rod 32 and the intermediate part 60.

As illustrated by FIG. 20, when the control rod 32 accomplishes its drop to reach the bottom position, the rod 32 then controls the change in position of the gripping means 50 from the retracted position toward the deployed position by the engagement between the control surface 88, here in the shape of a truncated cone, carried by the rod 32 and the balls 78.

More specifically, the rod 32 has completely descended when the balls 78 penetrate the groove 90 of the rod 32 that is designed to lock the gripping means 50 in the deployed position.

The release is carried out by controlling the actuating means 40 to exert a traction force on the rod 32 and to move it vertically upward.

During the upward movement, the rod 32 entrains with it the intermediate part 60 and the preform 12 whose neck 16 is held by the gripping means 50, locked in the deployed position.

Figure 21:
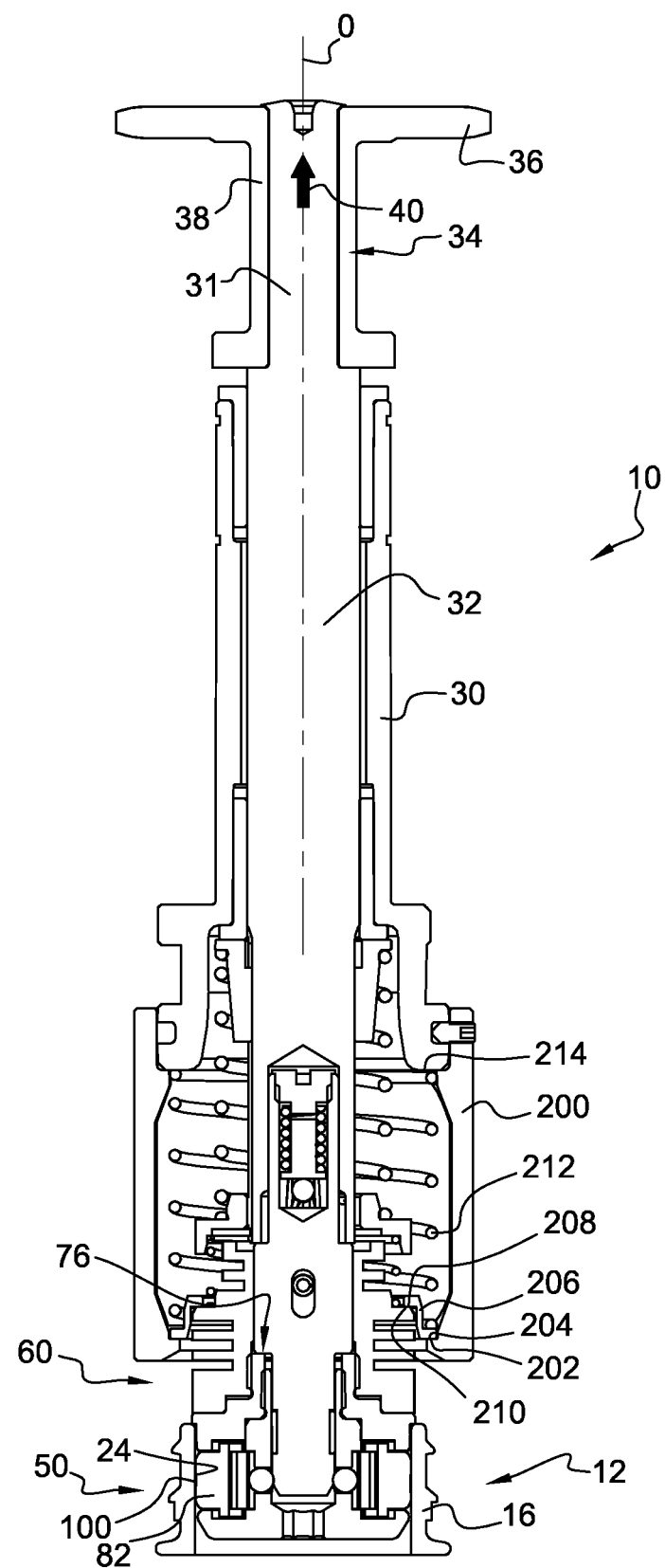

As illustrated in FIG. 21, the intermediate part 60 moves vertically upward relative to the stop 206 that remains in the position that is occupied above in FIG. 20 and determined by the engagement between its first lower face 204 with the upper face 202 of the support 200.

By comparison between FIGS. 20 and 21, it is possible to see that the relative movement between the intermediate part 60 and the stop 206 cancels out the vertical play; the upper face 210 of the intermediate part 60 will actually engage with the second lower face 208 of the stop 206.

The return spring 64 vertically stresses downward the intermediate part 60, or in a direction opposite to that of the rod 32 that the actuating means 40 move upward.

The operation remains identical to that of the first embodiment; the return spring 64 restores the energy previously stored by compression at the time of the lowering of the rod 32 downward, and the return force applied by the spring 64 brings about a relative movement between the rod 32 and the intermediate part 60, within the limits of the vertical travel determined by the first stop means 70.

Figure 22:
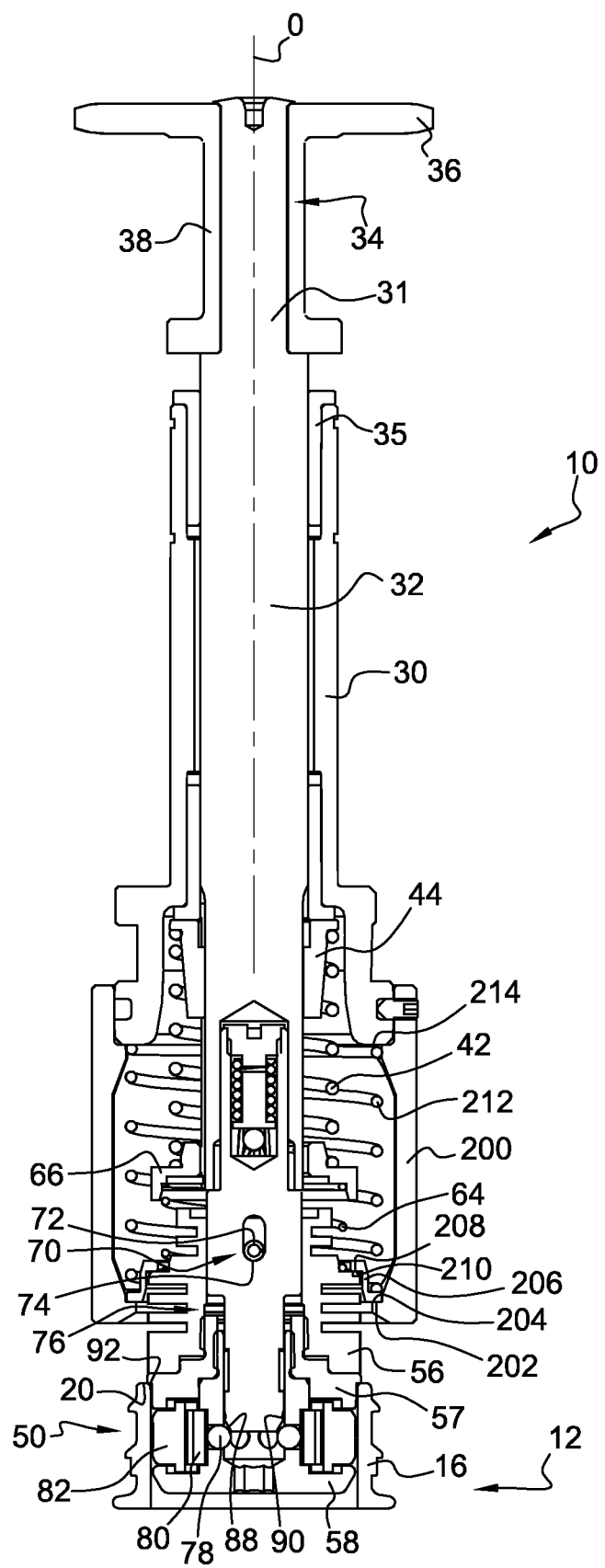

As illustrated in FIG. 22, the pin 72 abuts against the lower edge of the hole 74, and the intermediate part 60 is then integral, movably connected with the control rod 32.

The stop 206 is stressed vertically downward by the return spring 212 in such a way that the return force that is applied by the spring 212 on the movable stop 206 has an opposite direction and opposes the vertical movement of the intermediate part 60.

The additional force applied by the stop 206 on the intermediate part 60 makes it possible to achieve the unlocking of the gripping means 50 and to release the balls 78 from the groove 90 of the control rod 32.

Figure 23:
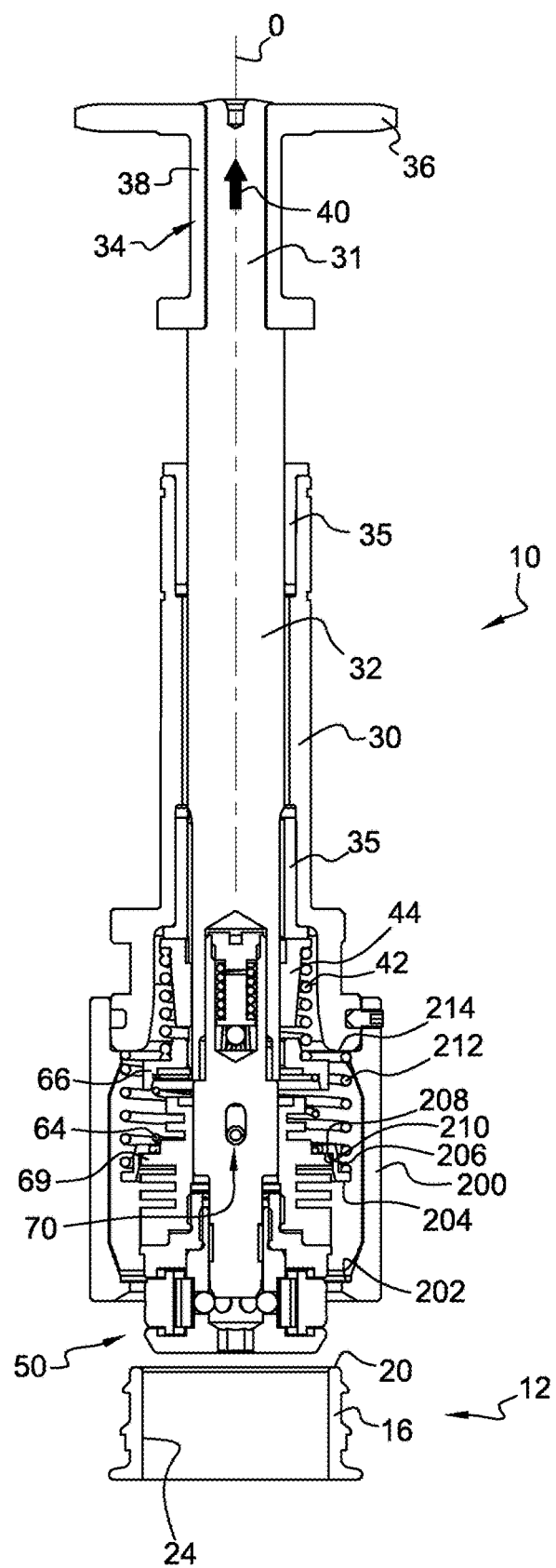

As shown in FIG. 23, the gripping means 50 again occupy the retracted position in which the outer diameter of the ring 82 is smaller than the inner diameter of the neck 16 of the preform 12; the preform 12 is then no longer held, and it is released by the transport device 10.

The control rod 32 is moved vertically upward by the actuating means 40 until reaching the top position; the transport device 10 according to FIG. 23 is again in its first operating position and, after evacuation of the released preform 12, the transport device 10 is able to ensure the gripping of a new preform 12.

Advantageously, the control of the unlocking of the locking means 90 according to this second embodiment is done without engaging with the edge 20 of the neck 16.

The results of the effort to lighten the containers were already explained above.

Advantageously, the second embodiment offers a particularly advantageous alternative to the first embodiment when the edge 20 of the neck 16 is radially narrow.

Actually, at least the radially inner part of the edge 20 is to remain free to make it possible for the shoulder forming the control stop 92 to abut during the lowering of the rod 32 for the purpose of gripping or for exerting an assist force during the release of the preform 12.

Advantageously, the second embodiment also makes it possible to limit the contacts with the edge 20 of the neck 16 and by so doing the risks of microbiological contamination of the latter.

Below, a third embodiment of a transport device 10 of a hollow body such as a preform 12 equipped with a neck 16 will be described.

The following description will be given by way of comparison with the first embodiment and with reference to FIGS. 24 to 30.

This third embodiment of the transport device 10 is characterized mainly by the absence of an ejector 46 and by gripping means 50 not comprising a radially deformable elastic element.

The references that are identical to those of the first embodiment refer to identical, analogous or similar elements.

According to this third embodiment, the transport device 10 comprises a stationary element 30 in which the control rod 32 slides vertically, respectively between a top position and a bottom position.

The rod 32 is moved vertically upward by means of actuating means 40 that act selectively on the driving part 34 that is integral with the upper end 31 of the rod 32.

The rod 32 is returned automatically downward by the return spring 42. The spring 42 rests on the ring 44 and on the cup 66 that, stressed vertically downward by the spring 42, abuts the ring 65 that is integral with the control rod 32.

Preferably, the rod 32 is made in two parts and comprises a lower detachable part 33 that is connected integrally to the rod 32 by means of the bayonet-type connecting means 54.

The transport device 10 comprises an intermediate part 60 that is made in two parts, respectively an upper part 56 and a lower part 58 that are integral upon movement in the vertical direction.

The upper part 56 comprises thermal dissipation means 62 formed by, for example, fins.

The upper part 56 is movably connected vertically to the control rod 32 in such a way as to form a movable apparatus, with relative travel between the part 56 and the rod 32.

The upper part 56 of the intermediate part 60 is mounted to move vertically against a return spring 64 that respectively rests at its upper end on the lower face of the cup 66 and at its lower end on the shoulder 69 carried by the part 56.

The intermediate part 60 is returned automatically vertically downward by the intermediate return spring 64.

The transport device 10 comprises a support 300 that is integral with the body 30 and that comprises an upper stop face 302 for immobilizing vertically downward the intermediate part 60 whose shoulder 69 comprises a lower face 304 designed to engage with said face 302.

Figure 24:
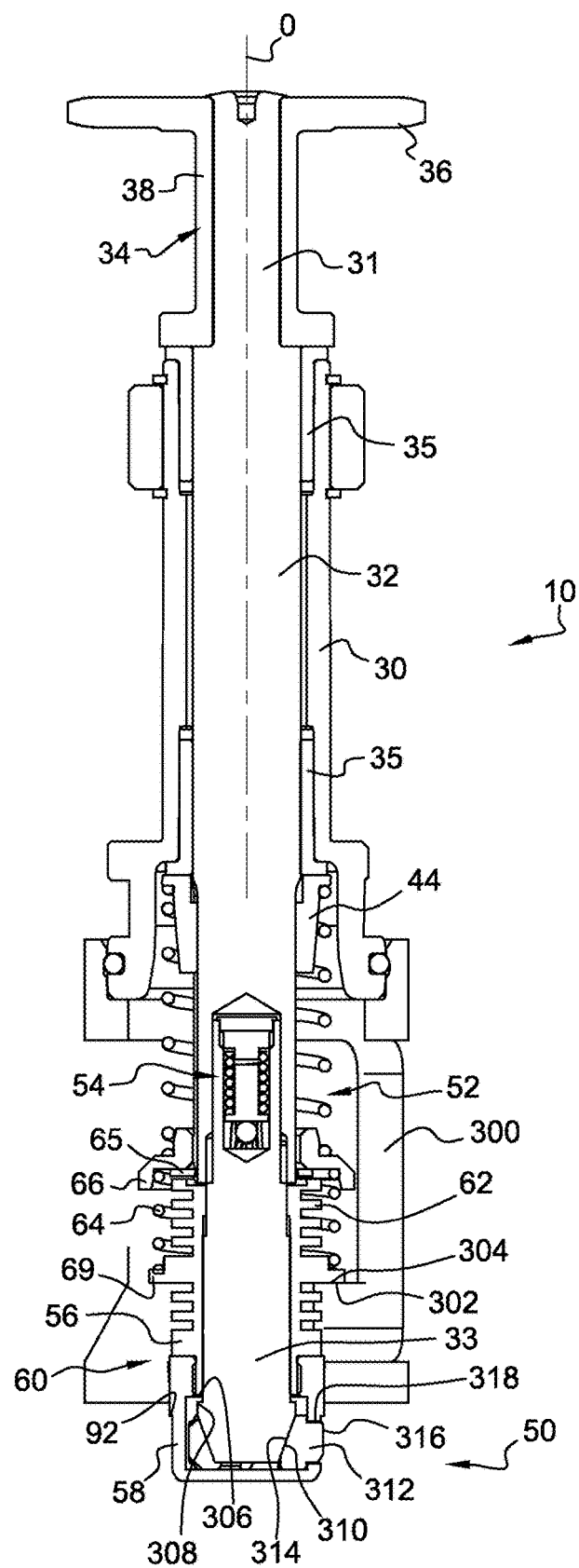

As shown in particular in FIG. 24, the lower position of the upper part 56 of the intermediate part 60 is determined by the abutting of the lower face 304 of the shoulder 69 against the upper face 302 of the support 300.

The upper part 56 of the intermediate part 60 comprises at its lower end a lower stop face 306 that is designed to engage with a shoulder 308 that the control rod 32 comprises.

The relative travel between the control rod 32 and the intermediate part 60, here its upper part 56, is consequently determined by stop means.

The face 302 of the support and the face 304 of the part 60 determine the relative position of the part 60 relative to the control rod 32 when the transport device 10 is in the position of rest shown in FIG. 24.

By comparison with the first method, said faces 302, 304 ensure the stop function in the free state, the stop function ensured by the first stop means 70 formed by the pin 72 and the hole 74.

The lower stop face 306 of the intermediate part 60 and the constituent shoulder 308 determine the position of the part 60 relative to the control rod 32 when said rod 32 is moved vertically upward.

By comparison with the first method, the face 306 and the shoulder 304 ensure the function of the second stop means 76 when the rod 32 is moved vertically upward.

The control rod 32, here its lower part 33, comprises a truncated, cone-shaped, so-called control surface 310 at its lower end.

The gripping means 50 are carried by the lower part 58 of the intermediate part 60 that consists of a part that has a "U" shape in a vertical section.

In this third embodiment, the gripping means 50 are formed by at least two pads 312, preferably and as illustrated in FIGS. 29 and 30, in a cutaway; the three pads 312 are distributed circumferentially in a uniform manner at 120°.

Each pad 312 comprises an inner face 314 that, in the shape of a truncated cone, is complementary to the control surface 310 of the rod 32 with which said inner face 314 engages during operation.

The control surface 310 has a slope that is such that the diameter of the lower part 33 of the rod 32 decreases by dropping vertically downward while, conversely, the inner face 314 of a pad 312 grows as it drops vertically downward.

The slopes of the control surface 310 and the inner face 314 of the pad 312 are reversed in such a way as to be engaged together according to a "wedge effect."

Each pad 312 comprises a vertically-oriented outer face 316 that is designed to engage with the inner wall 24 of the neck 16 for implementing the gripping of the preform 12.

The pads 312 are mounted to move radially between a retracted position and a deployed position in which each pad 312 radially projects toward the outside through an opening 318 that comprises the lower part 58 of the intermediate part 60.

FIG. 24 shows the transport device 10 in a position of rest, in the free state.

In this position of rest of the device 10, the gripping means 50 extend vertically projecting relative to the lower end of the support 300, outside of the housing 52.

By comparison with the first method, the gripping means 50 are in the deployed position. Actually, the intermediate part 60 is immobilized vertically by engaging with faces 302 and 304.

The control rod 32 is in the bottom position; the control surface 310 radially stresses toward the outside each pad 312 by means of their face 314, and each pad 312 projects radially relative to the opening 318.

In this deployed position of the gripping means 50, the outer diameter that is determined by the outer faces 316 of the pads 312 is greater than the inner diameter of the inner wall 24 of the neck 16.

Figure 25:
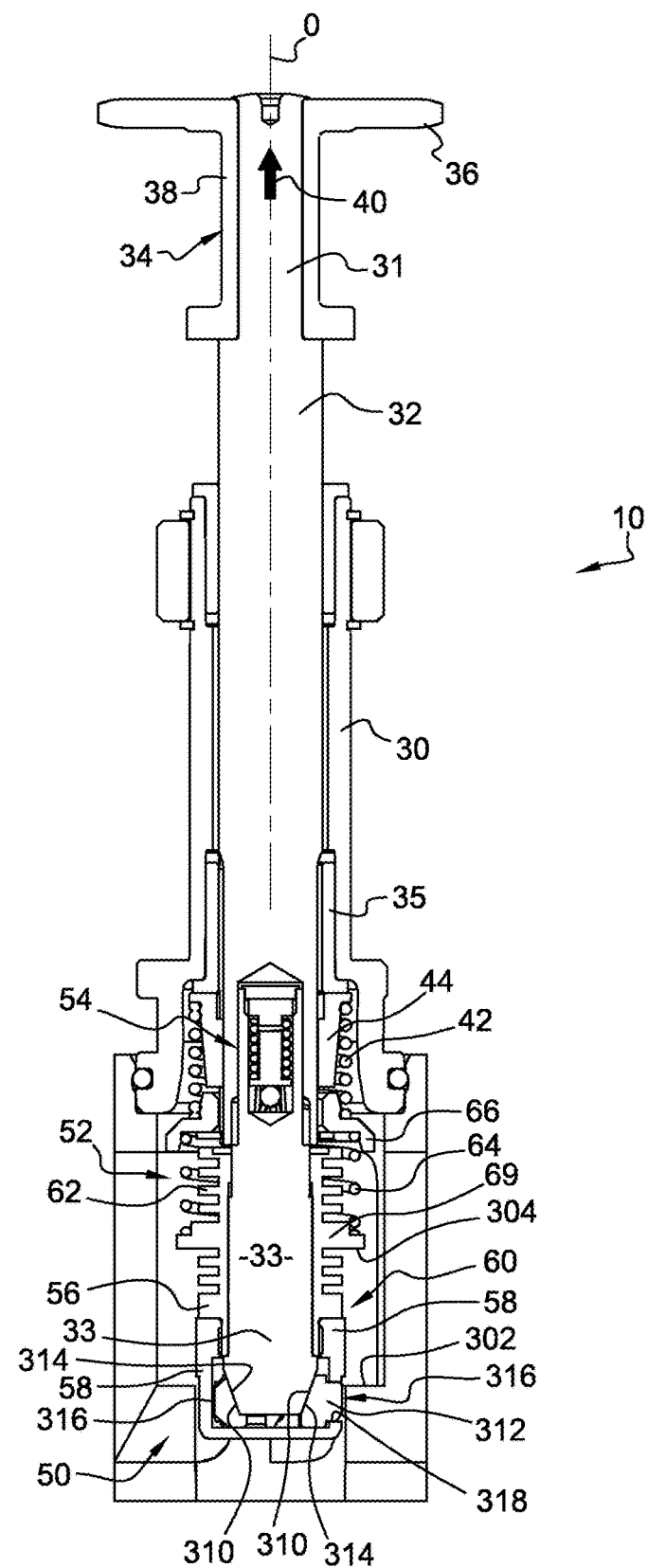

FIG. 25 shows the transport device 10 in a first operating position, a position that is reached after a first stage is carried out for the purpose of gripping the preform by the inside of the neck 16.

The first stage consists in controlling the actuating means 40 to move the control rod 32 vertically upward, from its bottom position toward its top position.

To do this, the actuating means 40 act as above in the first embodiment on the driving part 34 that is integral with the upper end 31 of the rod 32.

The control rod 32 is first of all the only one driven upward until the vertical play existing between the lower stop face 316 of the intermediate part 60 and the shoulder 308 of the lower part 33 of the rod 32 is zero.

The relative movement between the rod 32 and the intermediate part 60 controls the change in position of the gripping means 50 that pass from the deployed position to the retracted position.

The intermediate part 60 is then integral upon movement of the control rod 32.

The upward vertical movement of the movable apparatus formed by the rod 32 and the intermediate part 60 has the effect of retracting inside the housing 52, by withdrawal relative to the lower end of the support 300, with the gripping means 50 occupying their retracted position.

As illustrated in the cutaway of FIG. 29, the pads 312 are housed, in the retracted position, inside the lower part 58 in such a way that the outer diameter of the gripping means 50 then corresponds to that of the lower part 58 of the intermediate part 60.

Figure 26:
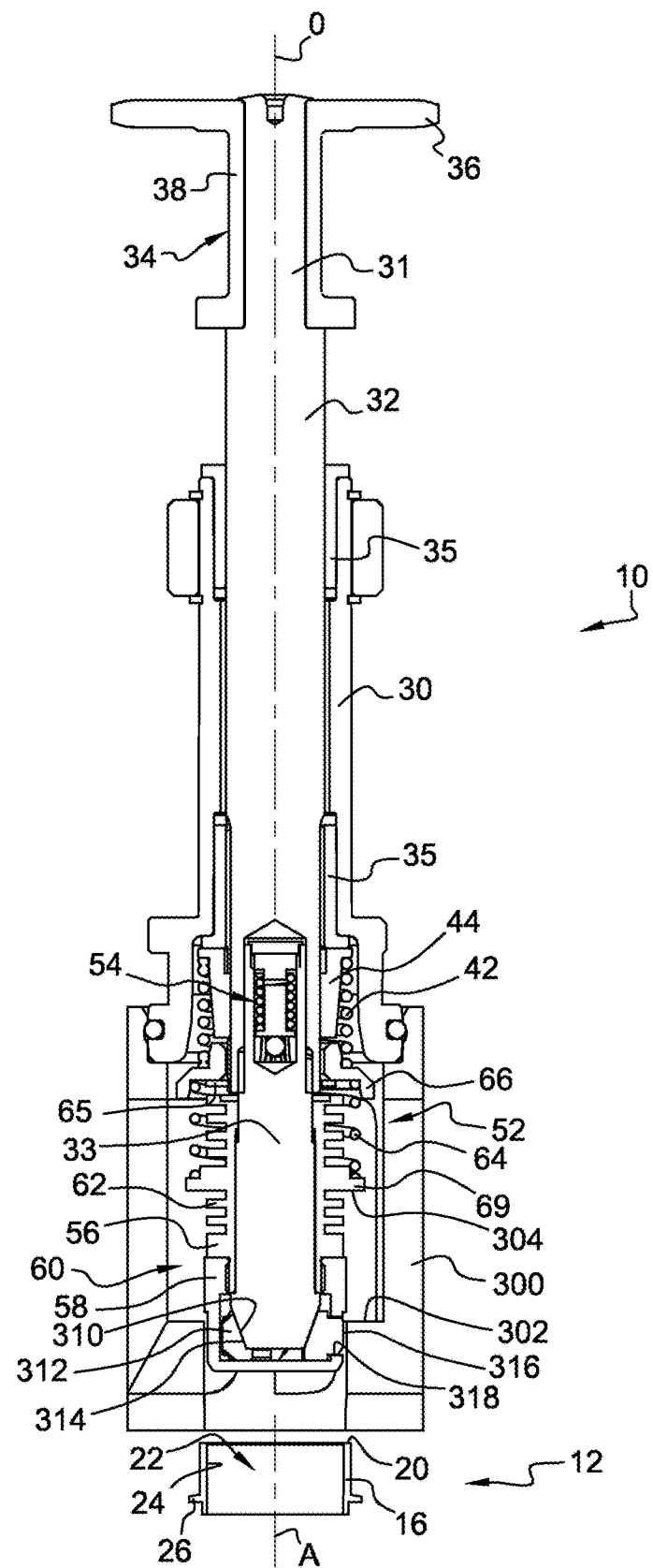

Advantageously, a preform 12 is then able to be inserted radially to occupy a specified reference position, illustrated in FIG. 26, in which the neck 16 is aligned vertically relative to the gripping means 50, perpendicular to said means 50 in such a way that the axis A of the preform is merged as a whole with the axis O of the transport device 10.

In a second stage, the actuating means 40 cease to exert their traction force on the rod 32 that is then returned automatically downward by the return spring 42.

During the lowering, in the direction of the opening 22 of the neck 16, the intermediate part 60 is immobilized by the abutting of the lower face 304 against the upper face 302 of the support 300.

The engagement of said faces 302 and 304 form a control stop that brings about an upward relative movement of the intermediate part 60 relative to the rod 32.

Figure 27:
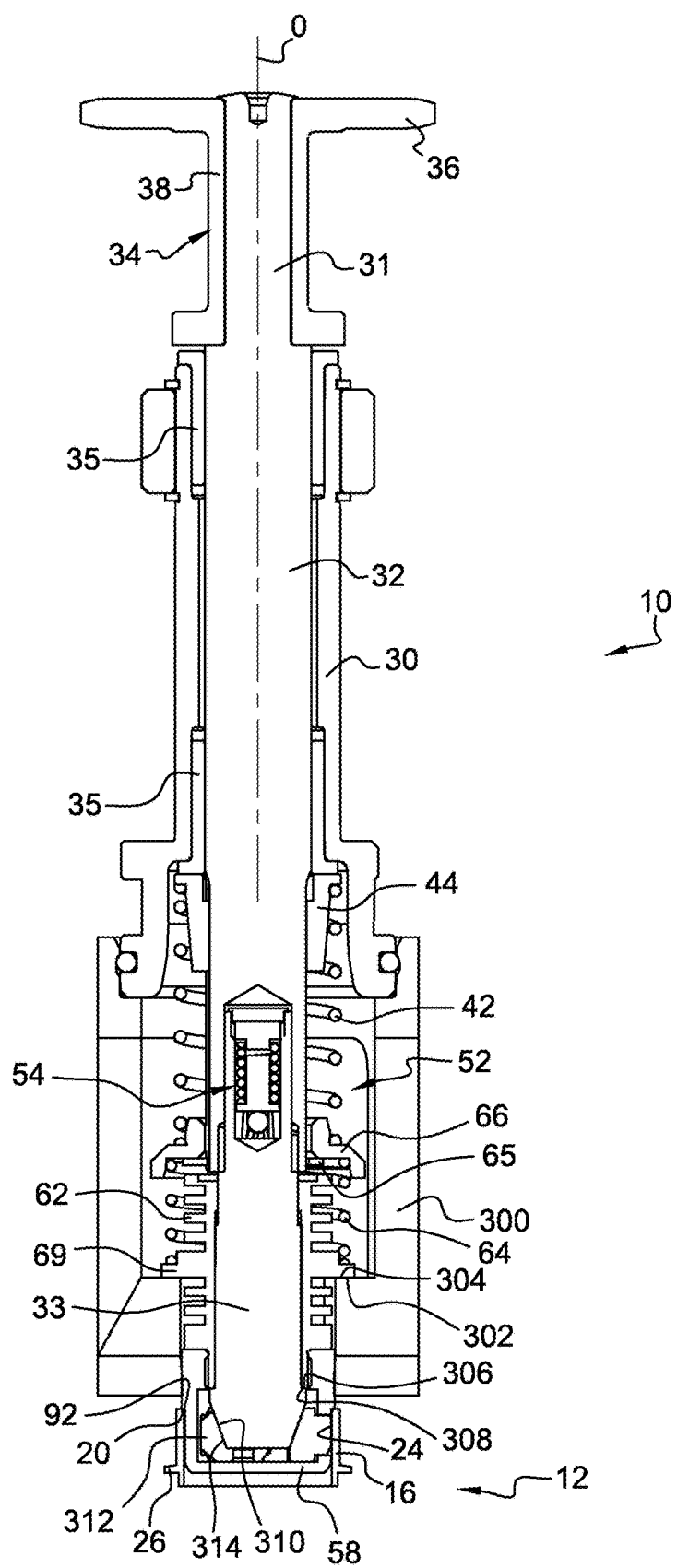

As illustrated in FIG. 27, the vertical positioning of the stop face 302 is determined in such a way that the gripping means 50 are inserted inside the neck 16 when the lower face 304 abuts against the latter.

By comparison with the first embodiment, the control stop function is therefore not ensured here by engagement between the edge 20 of the neck 16 and the shoulder 92 carried by the lower part 58 of the intermediate part 60.

As a variant, not shown, the control stop of the intermediate part 60 relative to the control rod 32 is provided by the shoulder 92 on the edge 20 of the neck 16, and there is then vertical play between the support face 302 and the lower face 304 of the intermediate part 60.

If the intermediate part 60 abuts, the control rod 32 continues its lowering owing to the relative travel existing between them.

The control surface 310 of the rod 32 will engage with the inner face 314 of each pad 312 that, stressed radially, then moves from the retracted position toward the deployed position.

Figure 28:
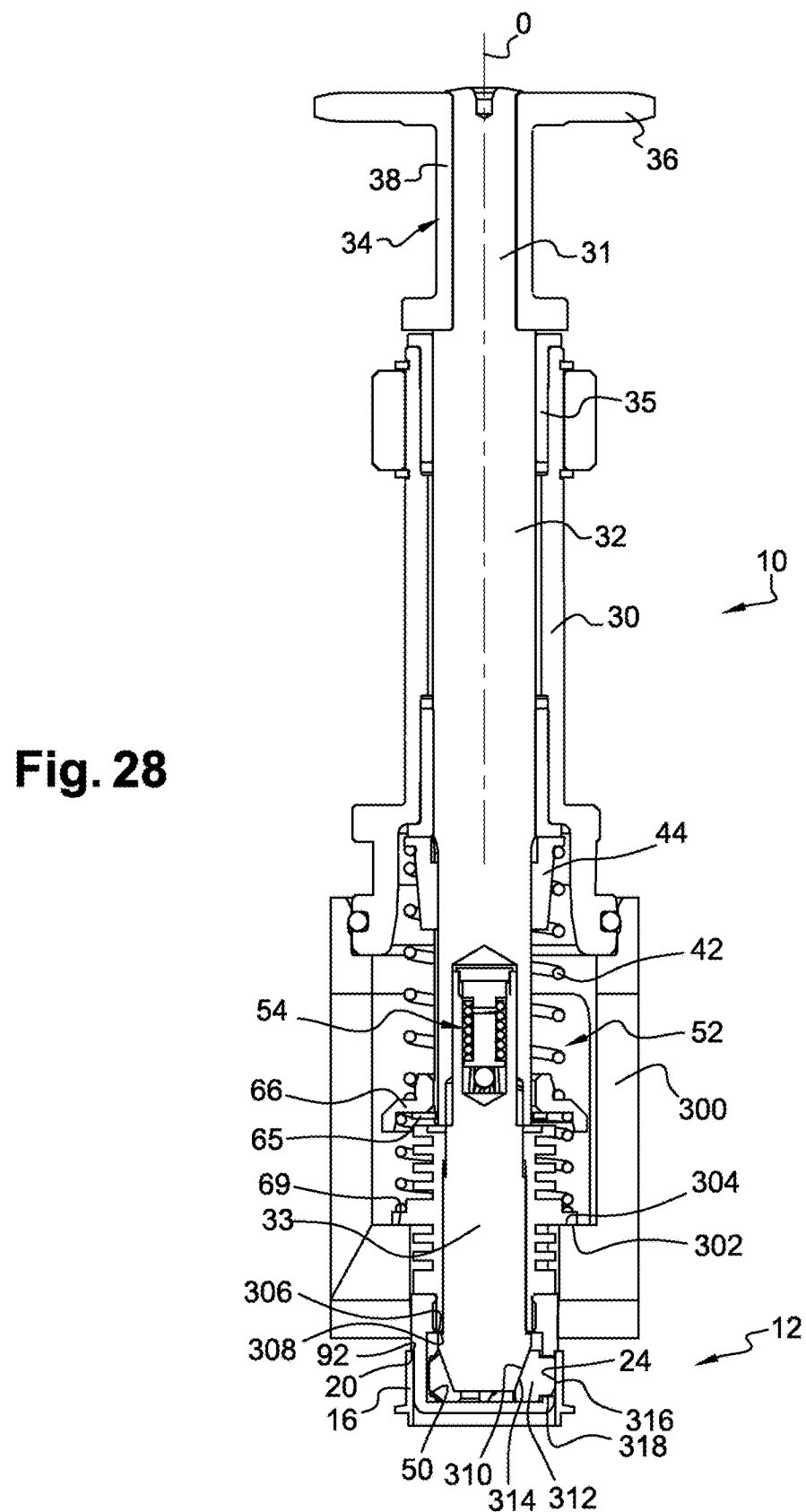

By comparison between FIGS. 27 and 28, corresponding vertical play appears between the lower face 306 and the shoulder 308.

The outer face 316 of each pad 312 then exerts on the inner wall 24 of the neck 16 radially opposite a force that is able to ensure the gripping of the preform 12 by the inside of the neck 16, leaving the outside of the neck free and detached.

Advantageously, the outer face 316 of each pad 312 is not flat but comprises raised parts, for example by means of ridges, for increasing the frictional forces during its engagement with the inner wall 24 of the neck 16.

During this second stage, the preform 12 is held in position until it is gripped by the means 50 of the transport device 10, for example by resting by means of its radial collar 26.

Advantageously, the engagement between the control surface 310 of the rod 32 and the inner face 314 of each pad 312 ensures an automatic locking by "wedge effect" of the gripping means 50 in the deployed position.

Preferably, the pads 312 that form the gripping means 50 and the control rod 32 are magnetized with opposite polarities in such a way as to obtain a magnetic attraction force between the pads 312 and the rod 32.

Advantageously, the pads 312 are thus returned automatically toward the retracted position by the magnetic attraction force when the control rod 32 is moved vertically upward for the purpose of the release.

Advantageously, the attraction force reinforces in the deployed position the frictional force that exists between the truncated cone-shaped surface 310 of the rod 32 and the inner face 314 of the pads 312.

The invention claimed is:

1. Device (10) for transporting a hollow body (12) that is equipped with a neck (16) that comprises a vertically-oriented inner wall (24) and an upper edge (20) that circumferentially delimits an opening (22) for access to the interior of said hollow body (12), with said device (10) comprising at least means (50) for gripping the hollow body (12) by engagement with the inner wall (24) of the neck (16) that are mounted at the lower free end of a control rod (32) and movably connected to the control rod (32), with said control rod (32) being mounted to move vertically between:
a top position in which the gripping means (50) are retracted upward by the control rod (32) to make it possible to insert the neck (16) of the hollow body (12) radially into a specified reference position relative to the gripping means (50) of the device (10), and
a bottom position in which the gripping means (50) engage radially with the inner wall (24) of the neck (16) to ensure the gripping of the hollow body (12),
wherein the gripping means (50) are mounted to move radially between:
a retracted position in which the gripping means (50) are inserted vertically from top to bottom inside the neck (16), without contact with the inner wall (24), and
a deployed position in which the gripping means (50) engage with the inner wall (24) of the neck (16),
wherein the change in position of the gripping means (50) from the retracted position toward the deployed position is controlled by the downward vertical movement of the control rod (32), from the top position toward the bottom position, and
wherein the device (10) comprises an intermediate support part (60) of the gripping means (50) that is movably connected to the control rod (32) and that is mounted to move vertically relative to the control rod (32), and an intermediate return element (64) toward the bottom of said intermediate part (60).

2. Device according to claim 1, wherein the device comprises a body (30) relative to which the control rod is mounted to move vertically, at least one vertical return element (42) of the control rod (32) toward its bottom position and actuating means (40) of the control rod (32) toward its top position against said return element (42).

3. Device according to claim 2, wherein the return element (42) of the control rod (32) and the intermediate return element (64) of the intermediate part (60) are mounted in series by means of a support element (66) and wherein a pre-set compression of the return element (42) of the control rod (32) is stronger than a pre-set compression of the intermediate return element (64) of the intermediate part (60).

4. Device according to claim 3, wherein the device (10) comprises stop means (70, 76) that determine a vertical travel between the intermediate part (60) and the control rod (32).

5. Device according to claim 1, wherein the device (10) comprises stop means (70, 76) that determine a vertical travel between the intermediate part (60) and the control rod (32).

6. Device according to claim 5, wherein the device (10) comprises at least first stop means (70) that are involved in movably connecting the intermediate part (60) to the control rod (32) when the control rod (32) is moved vertically upward.

7. Device according to claim 5, wherein the device (10) comprises means (90) for locking the gripping means (50) in the deployed position, and at least second stop means (76), that, when the control rod (32) is moved vertically downward, are located between the intermediate part (60) and the control rod (32) for positioning said locking means (90) vertically.

8. Device according to claim 1, wherein the intermediate part (60) comprises a control stop (92) that is able to engage with the edge (20) of the neck (16) for bringing about an upward relative movement of the intermediate part (60) relative to the control rod (32), against the intermediate return element (64).

9. Device according to claim 8, wherein the intermediate return element (64) of the intermediate part (60) is able to exert an assist force on the edge (20) of the neck (16) vertically downward.

10. Device according to claim 1, wherein the device (10) comprises means (90) for locking the gripping means (50) in the deployed position.

11. Device according to claim 1, wherein the intermediate part (60) comprises a stop (304) that can engage with a face (302) of a support (300) for bringing about an upward relative movement of the intermediate part (60) relative to the control rod (32), against the intermediate return element (64).

12. Device according to claim 1, wherein the device (10) comprises an ejector (46) that carries a support face (48) that is designed to engage with the edge (20) of the neck (16) to immobilize the neck (16) vertically upward when the control rod (32) is moved vertically upward.

13. Device according to claim 1, wherein the device (10) comprises a stop (206) that, being able to move against a return spring (212) downward, is able to engage with the intermediate part (60) to immobilize said intermediate part (60) vertically when the control rod (32) is moved vertically upward.

14. Device according to claim 1, wherein the control rod (32) comprises a control surface (88, 310) that, during the vertical movement of the control rod (32) downward, engages with the gripping means (50) for bringing about a radial movement of the gripping means (50) from the retracted position toward the deployed position.

15. Device according to claim 14, wherein the gripping means (50) are formed by pads (312) radially comprising on the inside an inclined face (314) that is designed to engage with the control surface (310) of the control rod (32) and wherein said pads (312) and the control rod (32) are magnetized to return the pads (312) automatically to the retracted position.

16. Device according to claim 1, wherein the gripping means (50) comprise at least transmission means (78, 98), at least a radially deformable elastic element (80), and gripping elements (82) of the hollow body (12) comprising an outer surface (100) that is designed to engage in the deployed position with the inner wall (24) of the neck (16).

17. Device according to claim 16, further comprising means (90) for locking the gripping means (50) in the deployed position, and wherein the transmission means (78, 98) comprise at least balls (78) that, during the change in position of the gripping means (50) toward the deployed position, engage with the control surface (88) of the control rod (32), and wherein said balls (78) are accommodated in a groove (90) of the control rod (32) forming said locking means of the gripping means (50) in the deployed position.

18. Device according to claim 17, wherein said at least one radially deformable elastic element is a wavy spring (80) that is designed to stress the gripping elements (82) radially, and wherein the transmission means (78) comprise a ring (98) that is inserted radially between the balls (78) and said spring (80).

* * * * *